(12) United States Patent
Yoneyama

(10) Patent No.: US 7,342,730 B2
(45) Date of Patent: Mar. 11, 2008

(54) ZOOM LENS OPTICAL SYSTEM

(75) Inventor: Shuji Yoneyama, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 11/363,353

(22) Filed: Feb. 27, 2006

(65) Prior Publication Data

US 2007/0097521 A1 May 3, 2007

(30) Foreign Application Priority Data

Oct. 31, 2005 (KR) .................. 10-2005-0103257

(51) Int. Cl.
*G02B 3/12* (2006.01)

(52) U.S. Cl. ............... 359/763; 359/774; 359/757

(58) Field of Classification Search ............ 359/763, 359/774, 757, 686, 682, 684

See application file for complete search history.

(56) References Cited

U.S. PATENT DOCUMENTS 6,721,105 B2 * 4/2004 Ohtake et al. ............. 359/676

2005/0190447 A1 * 9/2005 Misaka ..................... 359/557
2006/0056055 A1 * 3/2006 Obama et al. ............. 359/689

FOREIGN PATENT DOCUMENTS

| JP | 2002-098893 A | 4/2002 |
| JP | 2005-017915 A | 1/2005 |
| JP | 2005-055625 A | 3/2005 |
| JP | 2005-070437 A | 3/2005 |
| JP | 2005-107273 A | 4/2005 |

* cited by examiner

*Primary Examiner*—Tim Thompson
(74) *Attorney, Agent, or Firm*—Drinker Biddle & Reath LLP

(57) ABSTRACT

A compact zoom lens optical system suitable for use in a camera using a solid state photographing device and providing excellent correction of color aberrations, high zooming ratio, and telecentricity. The zoom lens optical system includes: a first lens group having a positive refractive power, the first lens group including two lenses; a second lens group having a negative refractive power; a third lens group having a positive refractive power; a fourth lens group having a positive refractive power; and a fifth lens group having a positive refractive power. The first through fifth lens groups are sequentially arranged from an object side and the first lens group is moved during zooming from a wide angle position to a telephoto position.

30 Claims, 32 Drawing Sheets

ZOOM LENS OPTICAL SYSTEM

CROSS-REFERENCE TO RELATED PATENT APPLICATION

This application claims the benefit of Korean Patent Application No. 10-2005-0103257, filed on Oct. 31, 2005 in the Korean Intellectual Property Office, the disclosure of which is incorporated herein in its entirety by reference.

BACKGROUND OF THE INVENTION

1. Field of the Invention

The present invention relates to a zoom lens optical system used for a photographing device such as classic or video cameras and, more particularly, to a zoom lens optical system with five lens groups designed to achieve an ultra-wide angle of view and high zooming ratio.

2. Description of the Related Art

Digital still cameras (DSCs) are currently receiving considerable attention as photographic devices. With the advancement of technology, DSCs tend to offer a wider angle of view, a higher zooming ratio, and a more compact design. To achieve these features, the DSCs commonly use a three-group zoom lens with a half field angle of 32° at wide angle position and 3× zooming ratio. The zoom lens includes three lens groups having negative, positive, and negative refractive powers, respectively.

In a conventional single-lens reflex (SLR) camera using 35 mm film, due to competitive development of a standard zoom lens with enhanced capabilities, a focal length (angle of view) is shortened to 24 mm at a wide angle position at half field angle of about 42° from 28 mm at half field angle of about 37° and a zoom ratio is increased to about 8× at about a 24-200 mm focal length from about 7× at a 28-200 mm focal length.

To achieve a wider angle of view and a higher zooming ratio for a digital camera as well, a zoom lens including five lens groups with positive, negative, positive, positive, and positive refractive powers has been proposed. Examples of a five-group zoom lens are disclosed in Japanese Laid-Open Patent Application Nos. 2002-98893, 2005-17915, 2005-55625, and 2005-70437.

A zoom lens optical system proposed in the Japanese Laid-Open Patent Application No. 2002-98893 has a high zooming ratio from 7× to 10× and about 37° of a half field angle at a wide angle position. The zoom lens optical system provides a wide angle of view comparatively and a high zooming ratio; the zoom lens optical system does not, however, provide a sufficiently wide angle of view.

Another example of a zoom lens optical system disclosed in the Japanese Laid-Open Patent Application No. 2005-17915 has a zooming ratio of about 5× and about 39° of a half field angle at a wide angle position. The zoom lens optical system provides a wide angle of view comparatively; however, the zoom lens optical system does not provide a sufficiently wide angle of view and high zooming ratio.

Another example of a zoom lens optical system proposed in the Japanese Laid-Open Patent Application No. 2005-55625 has a wide angle of view because a half field angle at a wide angle position is about 39° but a low zooming ratio of 3.9×.

Yet another example of a zoom lens presented in the Japanese Laid-Open Patent Application No. 2005-70437 has a half field angle of about 40° at a wide angle position and a zooming ratio of 7×. The zoom lens optical system has a wider angle of view and higher zooming ratio than the zoom lens optical systems proposed in the above-cited references but does not provide satisfactory wide angle of view and zooming ratio in view of the current tendency toward a wider angle of view and higher zooming ratio.

SUMMARY OF THE INVENTION

The present invention provides a compact zoom lens optical system with a half field angle of about 43° at a wide angle position and a high zooming ratio of about 8×, and which can be used in a solid state photographing device such as a charge-coupled device (CCD) with a small pixel pitch.

According to an aspect of the present invention, there is provided a zoom lens optical system including: a first lens group having a positive refractive power and including two lenses; a second lens group having a negative refractive power; a third lens group having a positive refractive power; a fourth lens group having a positive refractive power; and a fifth lens group having a positive refractive power. The first through fifth lens groups are sequentially arranged from an object side and the first lens group is moved during zooming from a wide angle position to a telephoto position.

The first lens group includes a first lens having a negative refractive power and a second lens having a positive refractive power and a refractive index $N_{I\_L2}$ of the second lens satisfies $1.65 < N_{I\_L2} < 1.8$ During zooming from the wide angle position to the telephoto position, a distance between the first and second lens groups and a distance between the fourth and fifth lens groups are increased, and a distance between the second and third lens groups is decreased.

The third lens group includes a first positive lens having a positive refractive power, a positive/negative doublet consisting of a second positive lens having a positive refractive power and a negative lens having a negative refractive power, and a third positive lens having a positive refractive power sequentially arranged from the object side. A refractive index $N_{III\_L8}$ of the second positive lens satisfies $N_{III\_L8} < 1.5$ and an Abbe number $\mathrm{¥}_{III\_L8}$ of the second positive lens satisfies $\mathrm{¥}_{III\_L8} > 80$.

When $f_W$, $f_{IV}$, and $f_{II}$ are the overall focal length at the wide angle position, the focal length of the fourth lens group IV, and the focal length of the second lens group II, respectively, the fourth and second lens groups satisfy $0 < f_W/f_{IV} < 0.20$ and $-0.90 < f_W/f_{II} < -0.50$.

DETAILED DESCRIPTION OF THE INVENTION

Figure 1A:
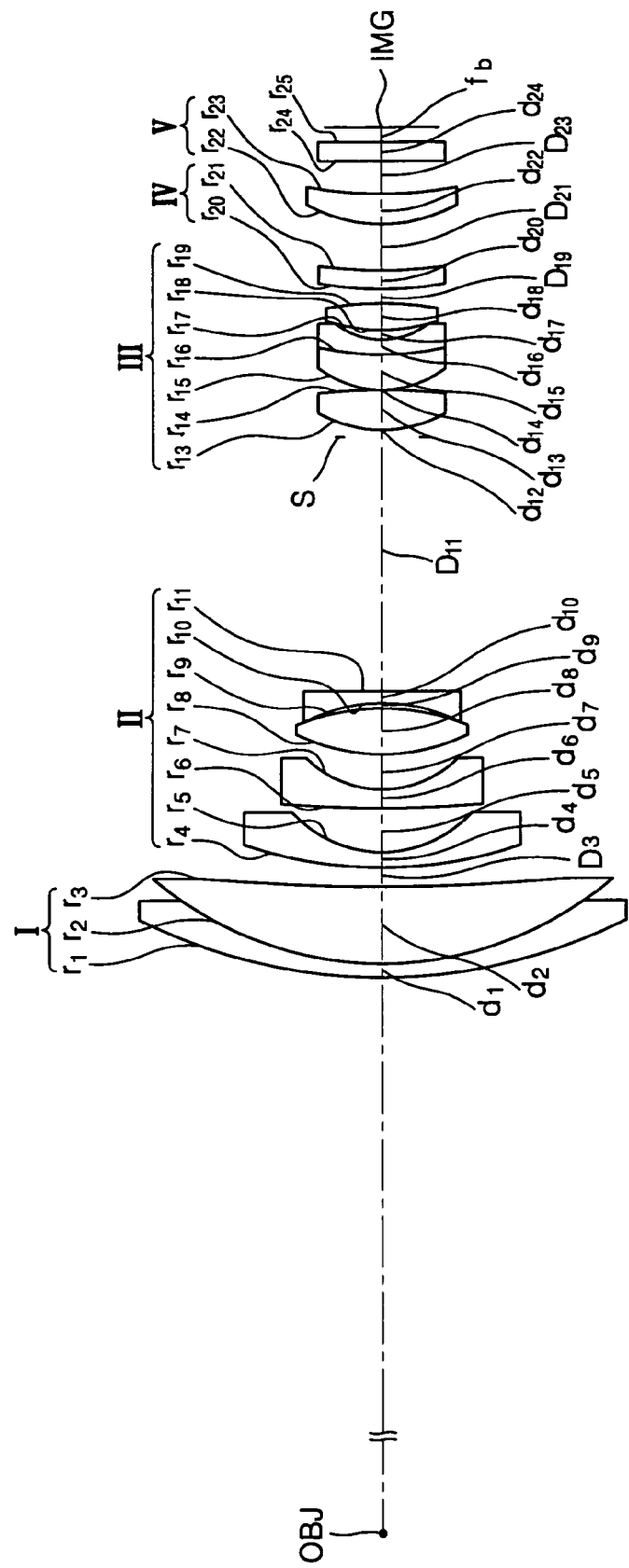
FIG. 1A is a cross-sectional view illustrating optical arrangement of a zoom lens optical system according to an embodiment of the present invention.
Figure 1B:
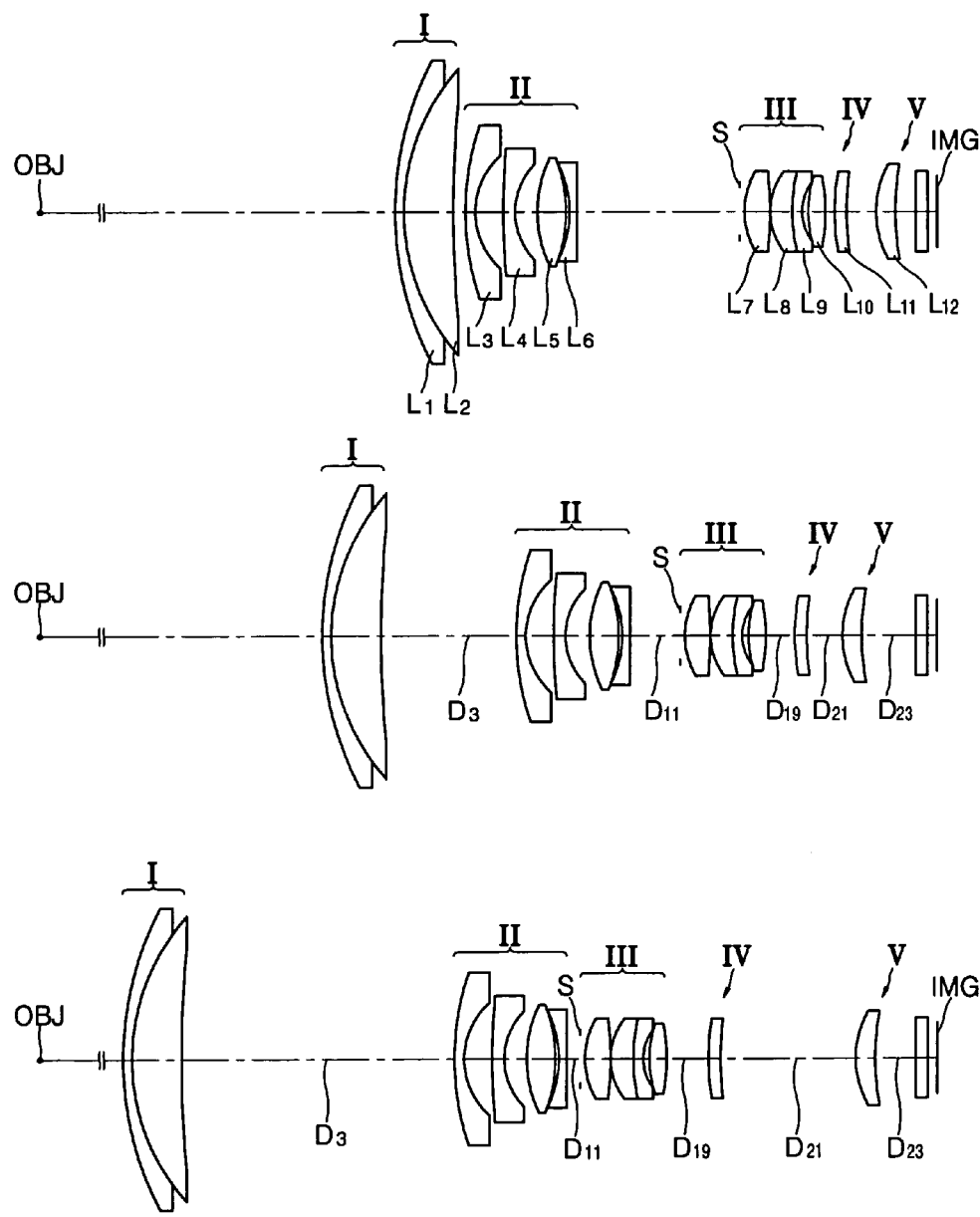
FIG. 1B are cross-sectional views illustrating optical arrangements of the zoom lens optical system of FIG. 1A at a wide angle position, a medium angle position, and a telephoto position, respectively.

FIG. 1A is a cross-sectional view illustrating optical arrangement of a zoom lens optical system according to an embodiment of the present invention, and FIG. 1B are cross-sectional views illustrating optical arrangements of the zoom lens optical system of FIG. 1A at a wide angle position, a medium angle position, and a telephoto position, respectively.

Referring to FIGS. 1A and 1B, the zoom lens optical system includes sequentially from an object side (OBJ), a first lens group I having a positive refractive power, a second lens group II having a negative refractive power, a third lens group III having a positive refractive power, a fourth lens group IV having a positive refractive power, and a fifth lens group V having a positive refractive power. The zoom lens optical system further includes an aperture stop S that is placed between the second and third lens groups II and III and moved together with the third lens group III.

The zoom lens optical system according to the current embodiment includes the five lens groups I through V, thus suppressing aberrations caused by a wide angle of view and high zooming ratio.

More specifically, the first lens group I has a positive refractive power and includes two lenses with which to achieve a high zooming ratio. Referring to FIG. 1B, the first lens group I is moved during zooming from wide angle position to telephoto position through medium angle position. The first lens group I may be moved in such a way as to increase a distance from the second lens group II during zooming to achieve a high zooming ratio. The first through fifth lens groups I through V are moved in such a way as to decrease a distance between the second and third lens groups II and III while increasing a distance between the fourth and fifth lens groups IV and V. In particular, the fifth lens group V is moved, forming a curve that is convex toward the object side OBJ.

The third and fourth lens groups III and IV are designed to have positive refractive powers. A distance between the third and fourth lens groups III and IV is changed during zooming to compensate for astigmatic field curvature worsened with increasing angle. In particular, because a significant amount of astigmatic field curvature is introduced at the wide angle position, the distance between the third and fourth lens groups III and IV may be changed significantly at the wide angle position.

When light is incident obliquely on an image plane of a photographing device such as a charge-coupled device (CCD), kerare (or vignetting) occurs because a telecentricity angle of the optical system does not match a combination of microlenses in the image plane of the photographing device. To prevent kerare, the telecentricity angle of the optical system should be adjusted so that light can be incident perpendicular to the image plane. The fifth lens group V may also be moved during zooming to adjust the telecentricity angle of the optical system. Kerare may occur when the optical path of an optical system is obstructed by a lens barrel so that a part of incident light is not incident on the photographing device. For example, a viewfinder is partially obstructed by the lens barrel, resulting in darkening of corners in an image.

The first lens group I may include a doublet of two lenses to provide a ultrawide angle of view (half field angle of about 43°) while suppressing an increase in lens diameter. The doublet consists of a first lens $L_1$ having a negative refractive power and a second lens $L_2$ having a positive refractive power cemented together. Because the first lens group I includes a single doublet of two lenses in this way, it is possible to suppress an increase in thickness of the first lens group I, prevent a lens diameter from increasing with a half field angle, and reduce the overall length of lenses.

The refractive index $N_{I\_L2}$ of the second lens $L_2$ may satisfy Equation (1):

$$1.65 < N_{I\_L2} < 1.8 \qquad (1)$$

By setting the refractive index $N_{I\_L2}$ of the second lens $L_2$ to a high value, it is possible to suppress spherical aberrations and coma at the telephoto position. When the refractive index $N_{I\_L2}$ of the second lens $L_2$ is less than the minimum limit, the radius of curvature of the lens in the doublet decreases to maintain a focal length, thereby increasing spherical aberration or coma on each lens surface. Conversely, when the refractive index $N_{I\_L2}$ of the second lens $L_2$ exceeds the maximum limit, only high-dispersion glass can be used. Thus, color aberration cannot be decreased.

To achieve an ultrawide angle of view using a retro-focus lens construction realized by decreasing the distance between the first and second lens groups I and II at the wide angle position, the second lens group II may have a strong negative refractive power as defined in Equation (2):

$$-0.90 < f_W/f_{II} < -0.50 \qquad (2)$$

where $f_W$ and $f_{II}$ denote the overall focal length at the wide angle position and the focal length of the second lens group II, respectively.

When the ratio exceeds the maximum limit so the refractive power of the second lens group II is decreased, the effect of a retro-focus lens construction at the wide angle position is reduced and no space is provided to locate a filter in front of an image plane IMG. Conversely, when the ratio is less than the minimum limit so the negative refractive power of the second lens group II becomes excessively high, the Petzval condition of the entire lens system cannot be kept at an appropriate level and positive spherical aberrations occurs so that spherical aberration of the entire lens system is overcorrected.

The Petzval condition is also called a Petzval sum, which can be defined by Equation (3):

$$P_z = \frac{P_1}{n_1} + \frac{P_2}{n_2} + \ldots + \frac{P_i}{n_i} \qquad (3)$$

where $P_Z$ is the Petzval sum, $P_i$ is a refractive power of the i-th surface, and $n_i$ is a refractive index of the i-th surface. The Equation (3) can be obtained by developing the amount of third-order astigmatic field curvature. A large Pz means large astigmatic field curvature.

Furthermore, because a lens $L_4$ in the second lens group II next closest to the object side OBJ has an aspherical surface, it is possible to correct distortion caused by the wider angle of view. Although a lens $L_3$ in the second lens group II closest to the object side OBJ is usually effective for distortion correction, the diameter of the lens $L_3$ tends to become large, thus increasing the manufacturing costs when glass is softened by heat and pressed into a mold. Thus, the lens $L_4$ rather than the lens $L_3$ is designed to have an aspherical lens in order to correct distortion.

The third lens group III may consist of four lenses to correct aberrations when large magnification is achieved to converge luminous flux diverging from the second lens group II. The aberration is kept small by using the four lenses to suppress an increase in variation of aberrations caused by large aberration and decenter when tangential field curvature is corrected with a small moving distance by changing the distance between the third and fourth lens groups III and IV.

More specifically, the third lens group III includes a first positive lens $L_7$ having a positive refractive power, a positive/negative doublet consisting of a second positive lens $L_8$ having a positive refractive power and a negative lens $L_9$ having a negative refractive power cemented together, and a third positive lens $L_{10}$ having a positive refractive power.

The first positive lens $L_7$ is a double convex lens and the second positive lens $L_8$ has a convex surface directed toward the object side OBJ. The negative lens $L_9$ has a concave surface directed toward the image plane IMG.

In particular, the first positive lens $L_7$ is constructed with two aspherical surfaces to have a large positive refractive power in order to converge light diverging from the second lens group II while correcting spherical aberration caused by the large positive refractive power. The two surfaces may be aspherical so as to disperse aspheric effect over the two surfaces, thus increasing the effect of correcting spherical aberration compared to a lens with a single aspherical surface. This may also reduce decenter sensitivity on both the surfaces of the first positive lens $L_7$.

The decenter sensitivity refers to the effect on optical aberrations or lens performance when a lens or lens group constituting an optical system or the entire optical system deviates from an optical axis, e.g., when it is oriented perpendicular to an optical axis direction. Because a lens fabricated by glass molding has a mold alignment problem during manufacturing, it is advantageous to reduce decenter sensitivity of a lens.

The second positive lens $L_8$ in the positive/negative doublet may be made of a material that satisfies conditions expressed by Equation (4):

$$N_{III\_L8} < 1.5$$

$$v_{III\_L8} > 80 \tag{4}$$

where $N_{III\_L8}$ and $v_{III\_L8}$ denote refractive index and Abbe number of the second positive lens $L_8$ in the third lens group III, respectively.

The Equation (4) defines the condition for selecting low-dispersion glass to provide excellent correction of color aberrations. When the second positive lens $L_8$ satisfies the conditions, it is possible to prevent an increase in color aberrations at the telephoto position while suppressing lateral color at the wide angle position.

By separating the positive/negative doublet from the third positive lens $L_{10}$ by an air gap, the surface of the negative lens $L_9$ in the positive/negative doublet directed toward the image side IMG acts as a strong diverging surface, thereby providing excellent correction of spherical aberrations or coma.

The fourth lens group IV includes a single lens $L_{11}$ to correct astigmatic field curvature. The refractive power of the fourth lens group IV may be made small to satisfy the following Equation (5), thus eliminating the effect of decenter sensitivity:

$$0 < f_W/f_{IV} < 0.20 \tag{5}$$

where $f_W$ and $f_{IV}$ respectively denote the overall focal length at the wide angle position and the focal length of the fourth lens group IV.

If the ratio defined by the Equation (5) is less than the minimum limit, the refractive power of the fourth lens group IV becomes negative. The fourth lens group IV acts as a rear converter to expand the range of the third lens group III, thus increasing decenter sensitivity. The rear converter means a rear tele-converter having a negative refractive power that is located on a rear image plane of an interchangeable lens for a single-lens reflex (SLR) camera to extend focal length like a telephoto lens while increasing the amount of aberration.

Conversely, if the ratio exceeds the maximum limit, the positive refractive power of the fourth lens group IV becomes excessively high, thus increasing the amount of aberrations introduced by the fourth lens group IV having the single lens $L_{11}$. The fifth lens group V may also include a single lens $L_{12}$ having a positive refractive power. The fifth lens group IV moves convexly toward the object side OBJ during zooming between the wide angle position and the telephoto position. By moving the fifth lens group V during zooming in this way, it is easy to adjust a telecentricity angle, thus preventing occurrences of kerare.

Tables 1 through 3 show the radius of curvature, a lens thickness or interlens distance, a refractive index, an aspheric coefficient (of an aspherical lens), dispersion, focal length, and f-number for each lens in the zoom lens optical system according to the embodiment illustrated in FIGS. 1A and 1B. R is the radius of curvature, D is a lens thickness or distance, $N_d$ is a refractive index for d-Line, $v_d$ is an Abbe number that will be defined by Equation (6) below, f is a focal length, and Fno is an f-number.

$$v_d = \frac{N_d - 1}{N_F - N_C} \tag{6}$$

where $N_F$ and $N_C$ are refractive indices for F- and C-Lines.

In embodiments of the present invention, each aspherical surface satisfies aspheric Equation (7):

$$x = \frac{c'y^2}{1+\sqrt{1-(K+1)c'^2 y^2}} + Ay^4 + By^6 + Cy^8 + Dy^{10} \tag{7}$$

where x denotes a depth from a vertex of a lens to a plane of the lens in a direction parallel to an optical axis, y denotes a height in a direction perpendicular to the optical axis, $c'(=1/R)$ denotes a reciprocal of the radius of curvature R at the vertex of the lens, K denotes a conic constant, and A, B, C, and D denote aspheric coefficients.

TABLE 1

| Lens | Surface | R | D | Nd | v d |
|---|---|---|---|---|---|
| $L_1$ | 1 | 36.909 | 1.00 | 1.84666 | 23.8 |
| $L_2$ | 2 | 24.696 | 5.49 | 1.77250 | 49.6 |
|  | 3 | 139.460 | D3 |  |  |
| $L_3$ | 4 | 34.465 | 0.90 | 1.88300 | 40.8 |
|  | 5 | 8.558 | 3.38 |  |  |
| $L_4$ | 6 | 300.000 | 1.30 | 1.80500 | 40.7 |
|  | 7 | 7.406 | 2.29 |  |  |
|  |  | (Aspherical) |  |  |  |
| $L_5$ | 8 | 14.250 | 3.21 | 1.84666 | 23.8 |
|  | 9 | −17.372 | 0.58 |  |  |
| $L_6$ | 10 | −12.356 | 0.80 | 1.88300 | 40.8 |
|  | 11 | −200.000 | D11 |  |  |
|  | S | Aperture stop | 0.50 |  |  |
| $L_7$ | 13 | 9.120 | 2.77 | 1.58290 | 58.9 |
|  |  | (Aspherical) |  |  |  |
|  | 14 | −37.935 | 0.10 |  |  |
|  |  | (Aspherical) |  |  |  |
| $L_8$ | 15 | 8.153 | 2.38 | 1.49700 | 81.6 |
| $L_9$ | 16 | 23.007 | 1.00 | 1.84666 | 23.8 |
|  | 17 | 5.956 | 0.74 |  |  |
| $L_{10}$ | 18 | 14.134 | 1.94 | 1.48749 | 70.4 |
|  | 19 | −34.031 | D19 |  |  |
| $L_{11}$ | 20 | 40.368 | 1.50 | 1.51500 | 63.0 |
|  | 21 | 53.880 | D21 |  |  |
|  |  | (Aspherical) |  |  |  |
| $L_{12}$ | 22 | 10.877 | 2.10 | 1.48749 | 70.4 |
|  | 23 | 30.159 | D23 |  |  |
|  | 24 | ∞ | 1.22 | 1.51680 | 64.2 |
|  | 25 | ∞ | fb |  |  |

TABLE 2

| Surface | K | A | B | C | D |
|---|---|---|---|---|---|
| 7 | −1.00 | −5.87266E−05 | 6.46273E−07 | −4.68387E−08 | 3.91263E−10 |
| 13 | −1.00 | −3.48648E−05 | −3.00931E−06 | −3.70329E−08 | 1.03273E−09 |
| 14 | −1.00 | −1.43578E−05 | −1.31604E−06 | −2.29296E−07 | 6.84268E−09 |
| 21 | −1.00 | 1.47010E−04 | −1.94538E−06 | 8.10580E−08 | −6.28292E−09 |

TABLE 3

| Variable distance | Wide angle position | Medium angle position | Telephoto position |
|---|---|---|---|
| f | 4.15 | 11.50 | 32.04 |
| Fno. | 2.88 | 3.20 | 4.12 |
| D3 | 1.500 | 15.161 | 30.315 |
| D11 | 17.828 | 5.556 | 1.500 |
| D19 | 1.000 | 3.155 | 4.439 |
| D21 | 3.032 | 3.803 | 14.965 |
| D23 | 2.338 | 6.026 | 4.492 |
| fb | 1.100 | 1.100 | 1.100 |

FIGS. 2A-2D, respectively, illustrate longitudinal spherical aberration, astigmatic field curvature, distortion, and lateral color at the wide angle position of the zoom lens optical system according to the embodiment illustrated in FIGS. 1A and 1B. FIGS. 3A-3D, respectively, illustrate longitudinal spherical aberration, astigmatic field curvature, distortion, and lateral color at the medium angle position thereof. FIGS. 4A-4D, respectively, illustrate longitudinal spherical aberration, astigmatic field curvature, distortion, and lateral color at the telephoto position thereof.

Figure 2A:
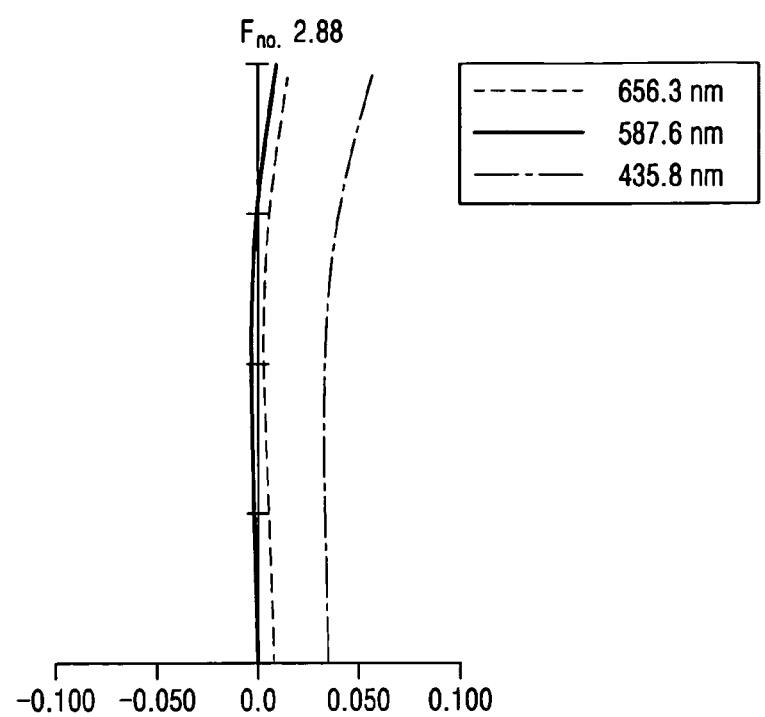
FIGS. 2A-2D illustrate longitudinal spherical aberration, astigmatic field curvature, distortion, and lateral color at the wide angle position of the zoom lens optical system according to the embodiment illustrated in FIGS. 1A and 1B, respectively.
Figure 2B:
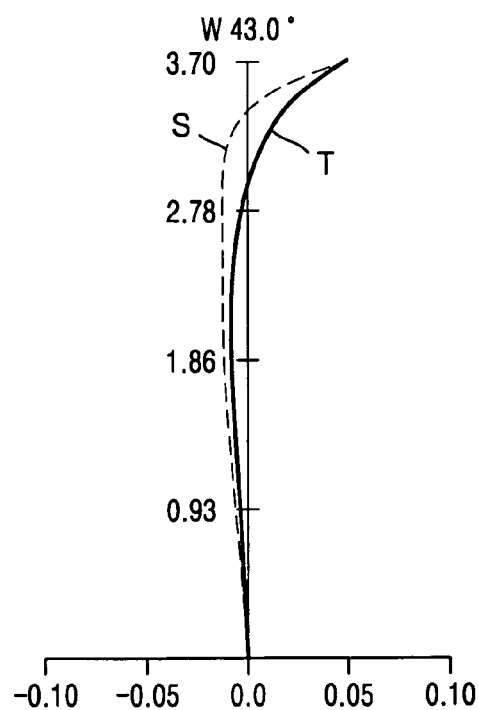
Figure 2C:
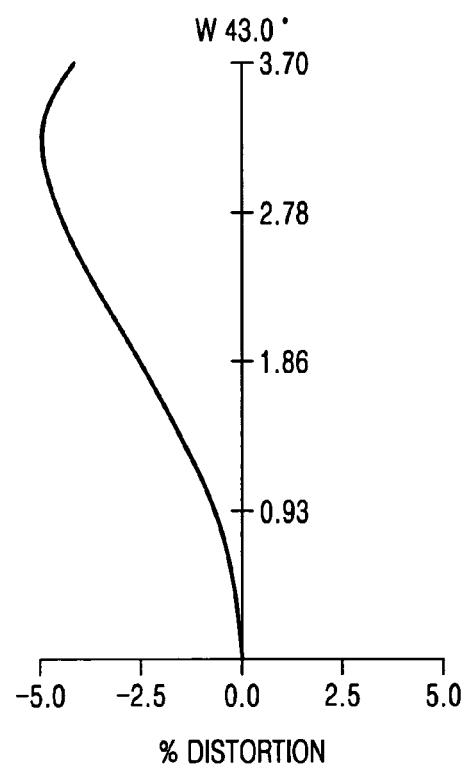
Figure 2D:
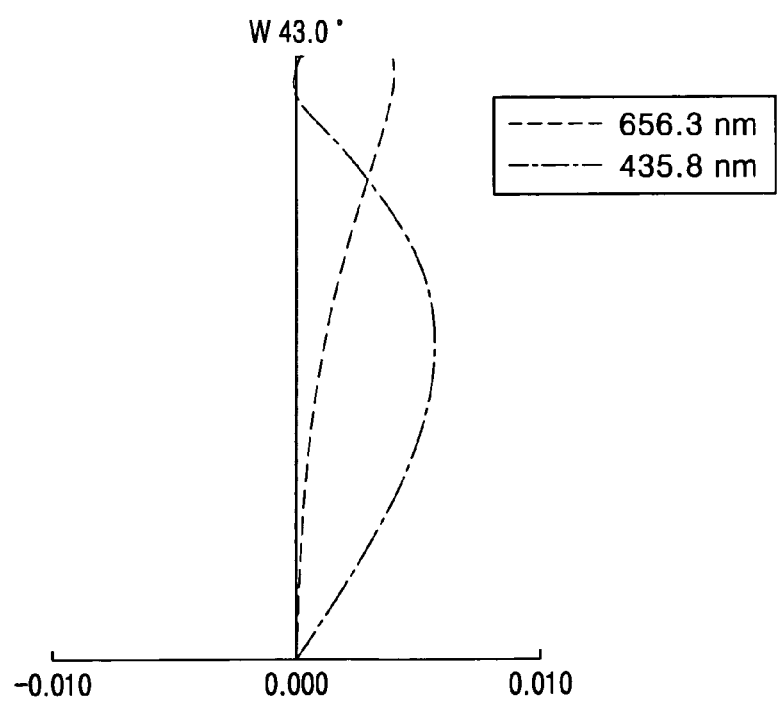
Figure 3A:
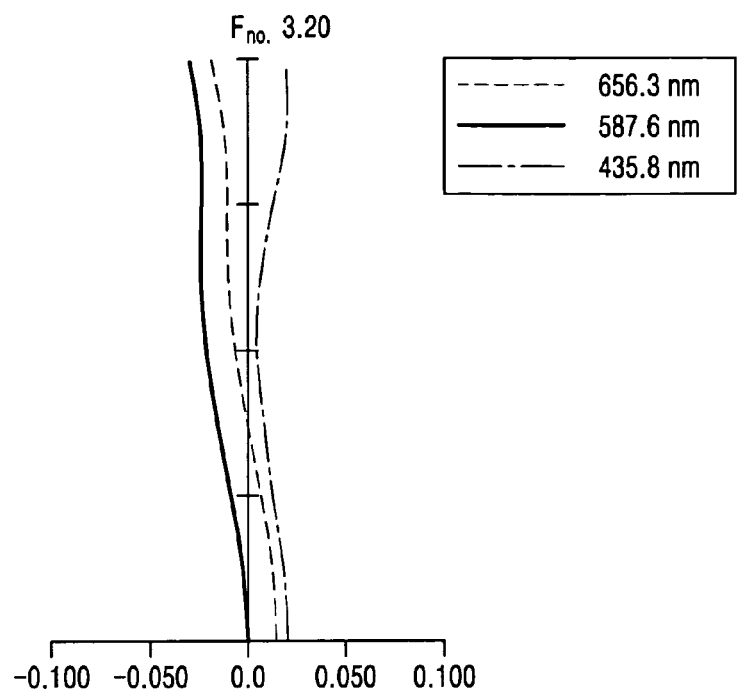
FIGS. 3A-3D illustrate longitudinal spherical aberration, astigmatic field curvature, distortion, and lateral color at the medium angle position of the zoom lens optical system according to the embodiment illustrated in FIGS. 1A and 1B, respectively.
Figure 3B:
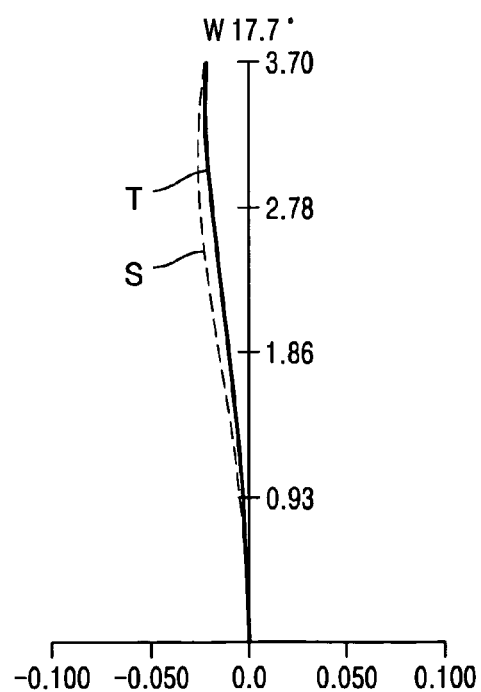
Figure 3C:
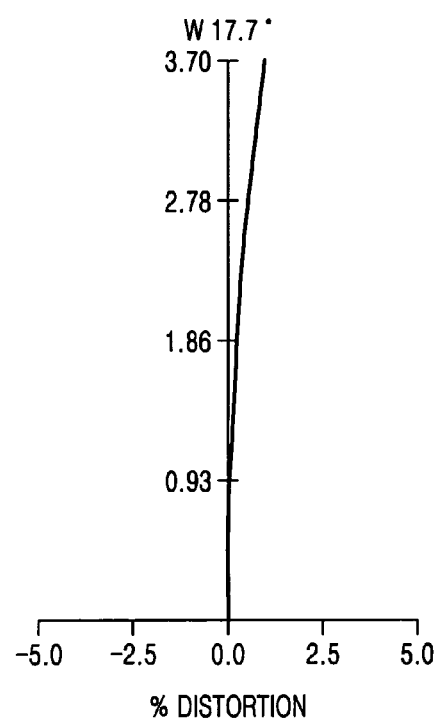
Figure 3D:
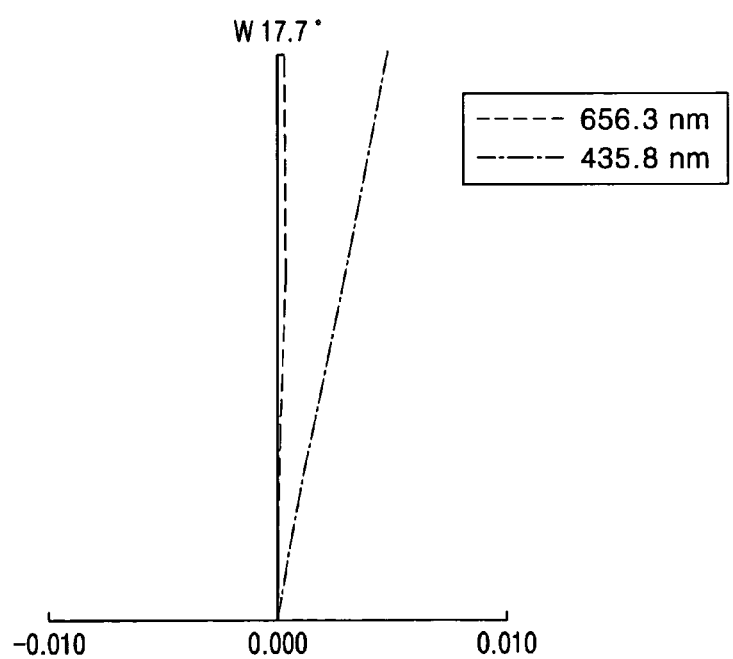
Figure 4A:
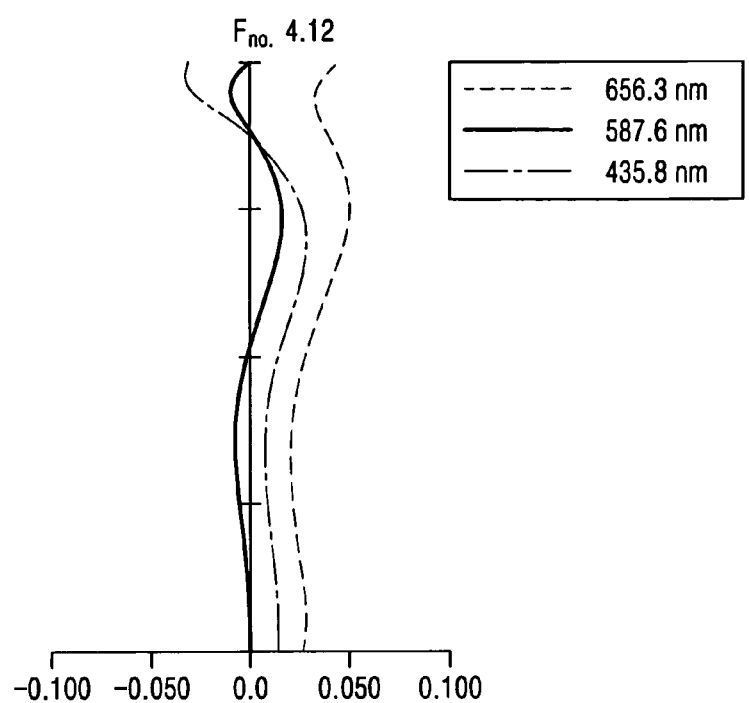
FIG. 4A-4D illustrate longitudinal spherical aberration, astigmatic field curvature, distortion, and lateral color at the telephoto position of the zoom lens optical system according to the embodiment illustrated in FIGS. 1A and 1B, respectively.
Figure 4B:
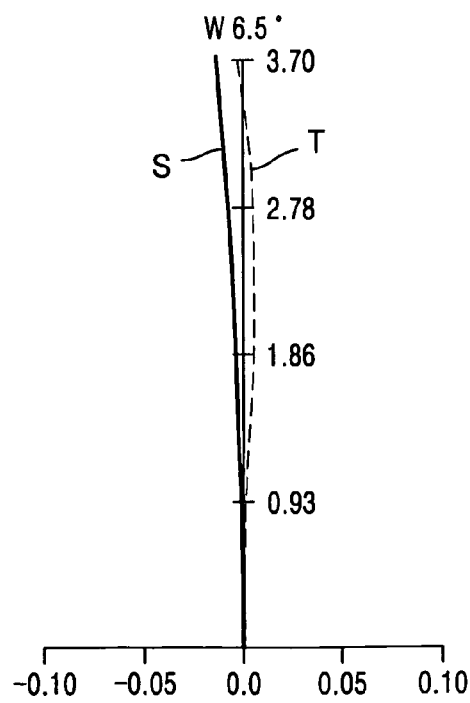
Figure 4C:
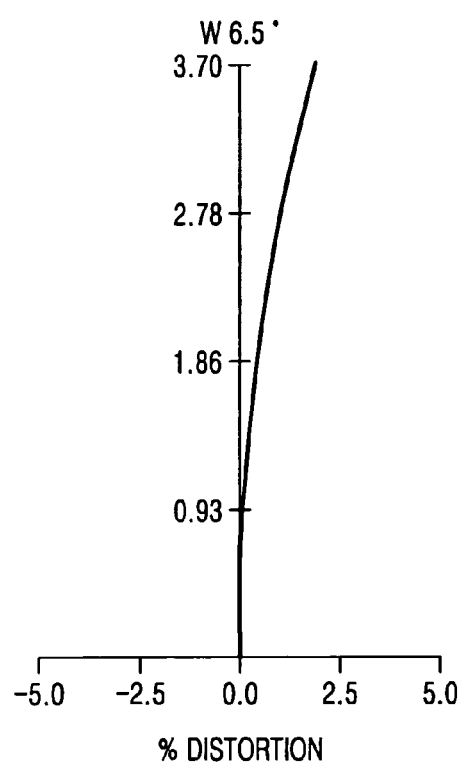
Figure 4D:
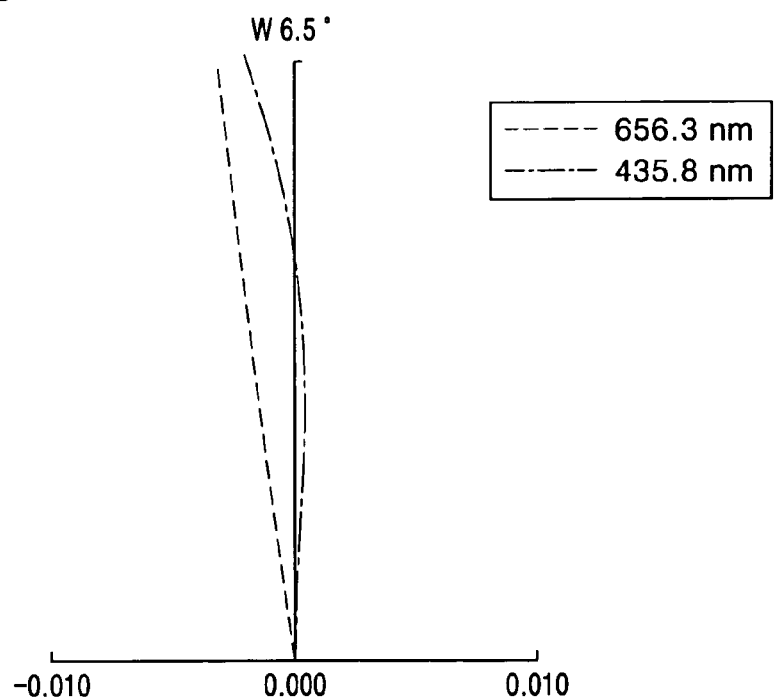

That is, FIGS. 2A, 3A, and 4A illustrate spherical aberrations of the optical system for light with various wavelengths, i.e., 435.8 nm, 587.6 nm, and 656.3 nm. FIGS. 2B, 3B, and 4B illustrate astigmatic field curvatures, i.e., astigmatic field curvatures T and sagittal field curvatures S, at the wide angle position, medium angle position, and telephoto position of the zoom lens optical system. FIGS. 2C, 3C, and 4C illustrate % distortions at the wide angle position, medium angle position, and telephoto position of the zoom lens optical system, respectively. FIGS. 2D, 3D, and 4D illustrate lateral colors for light with 656.3 nm and 435.8 nm.

Figure 5A:
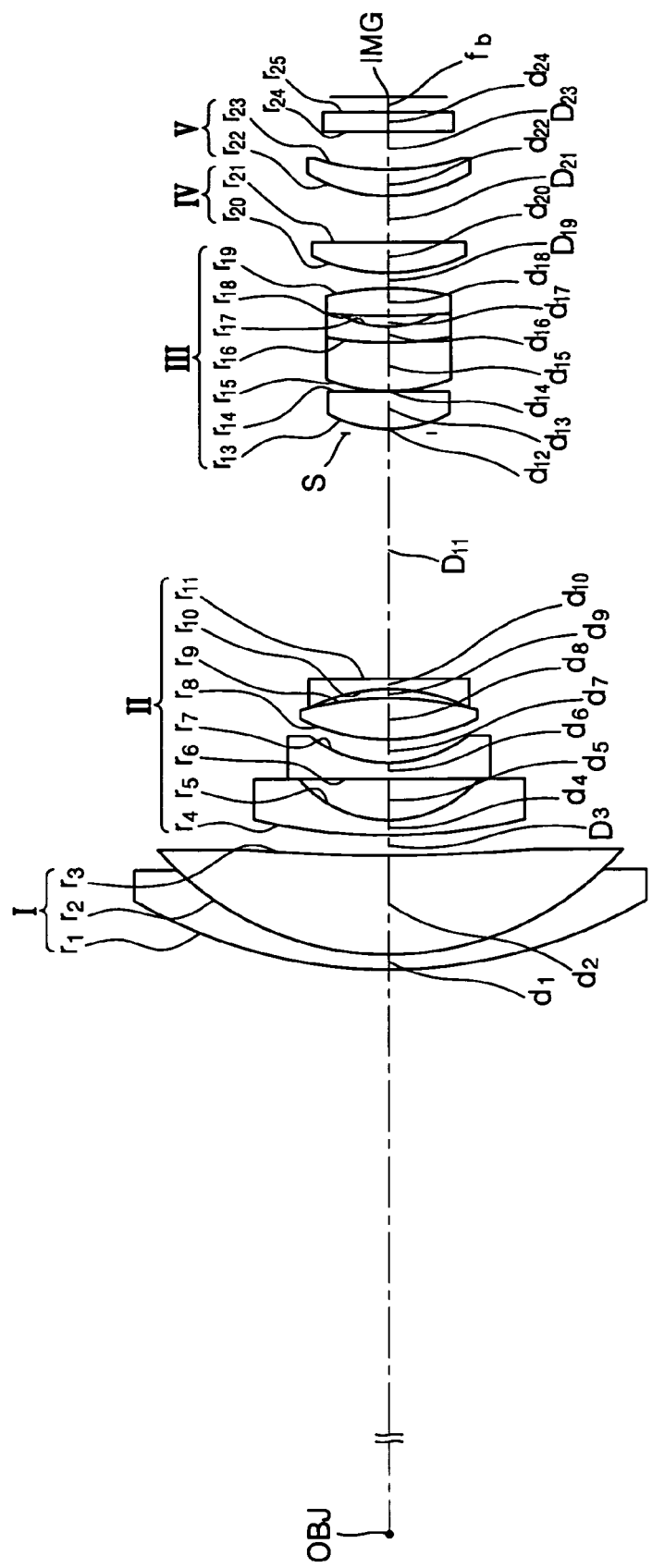
FIG. 5A is a cross-sectional view illustrating the optical arrangement of a zoom lens optical system according to another embodiment of the present invention.
Figure 5B:
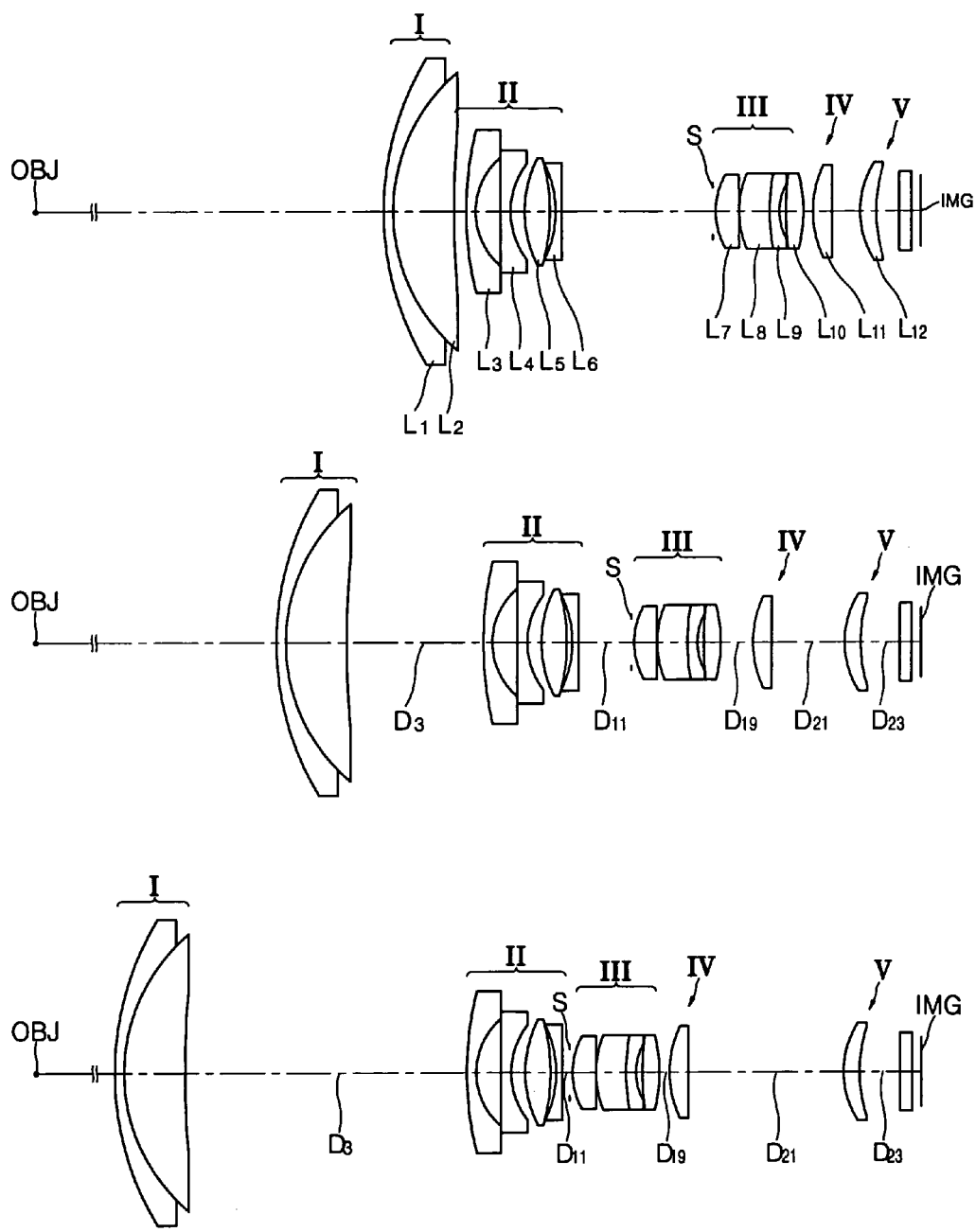
FIG. 5B are cross-sectional views illustrating optical arrangements of the zoom lens optical system of FIG. 5A at a wide angle position, a medium angle position, and a telephoto position, respectively.
Figure 6A:
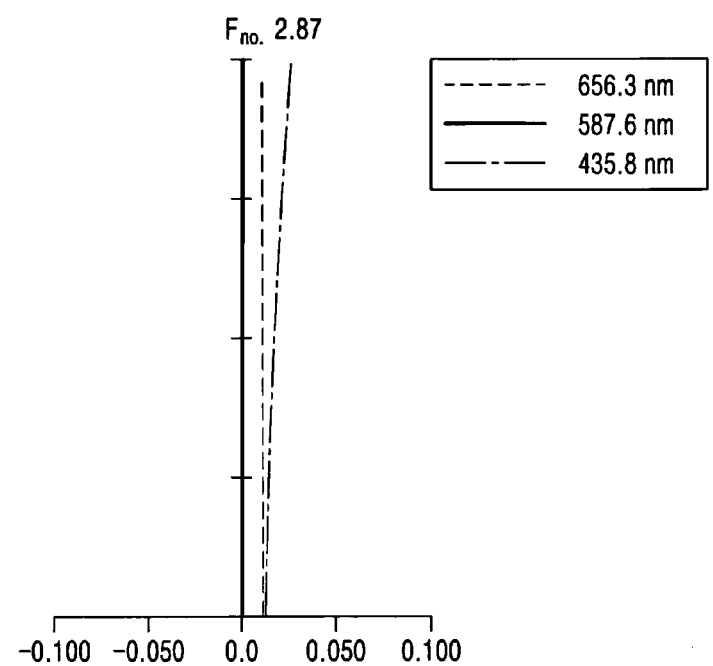
FIGS. 6A-6D illustrate longitudinal spherical aberration, astigmatic field curvature, distortion, and lateral color at the wide angle position of the zoom lens optical system according to the embodiment illustrated in FIGS. 5A and 5B, respectively.
Figure 6B:
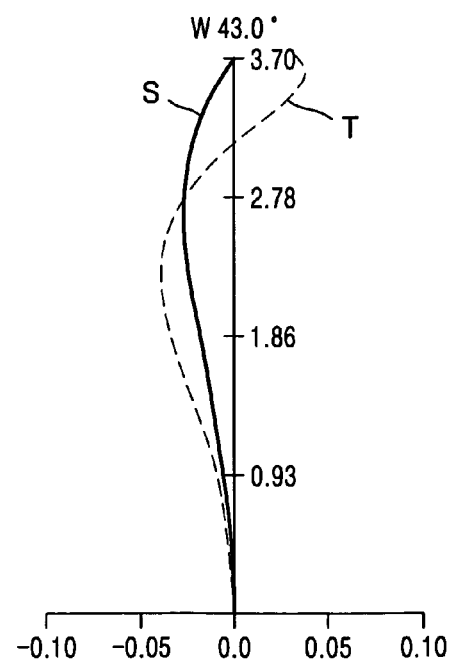
Figure 6C:
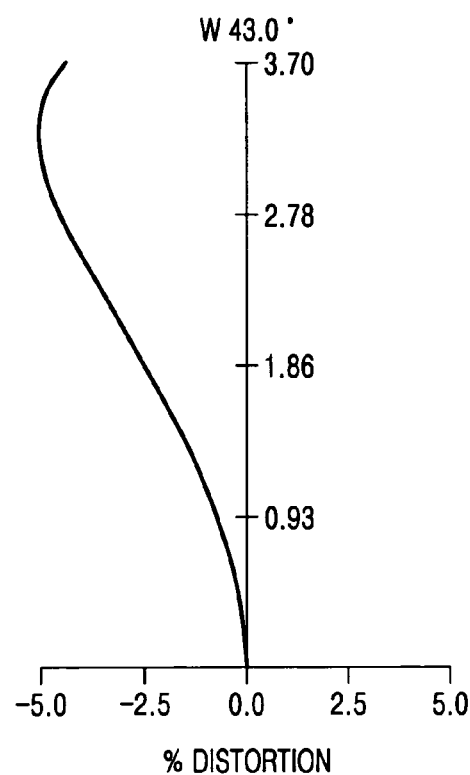
Figure 6D:
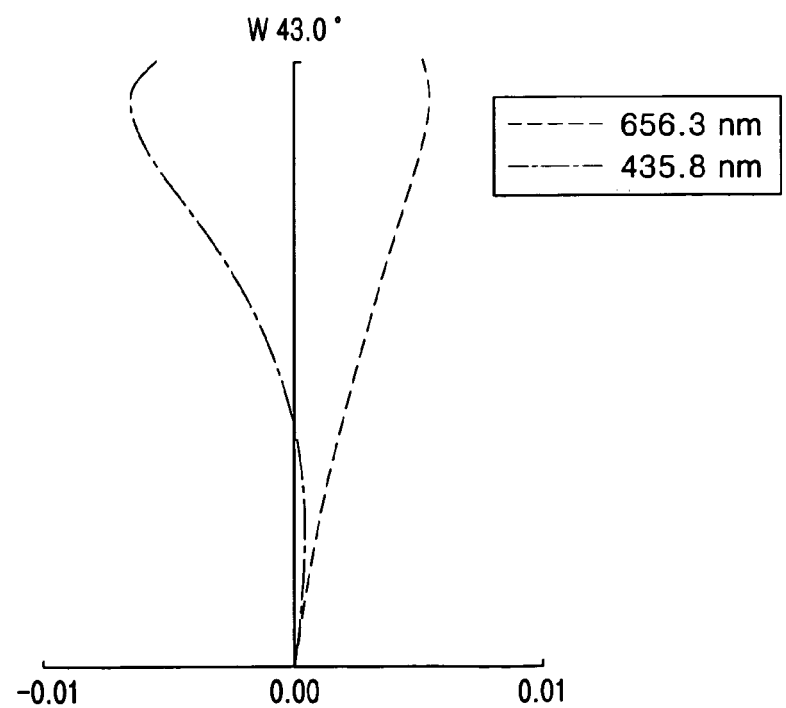
Figure 7A:
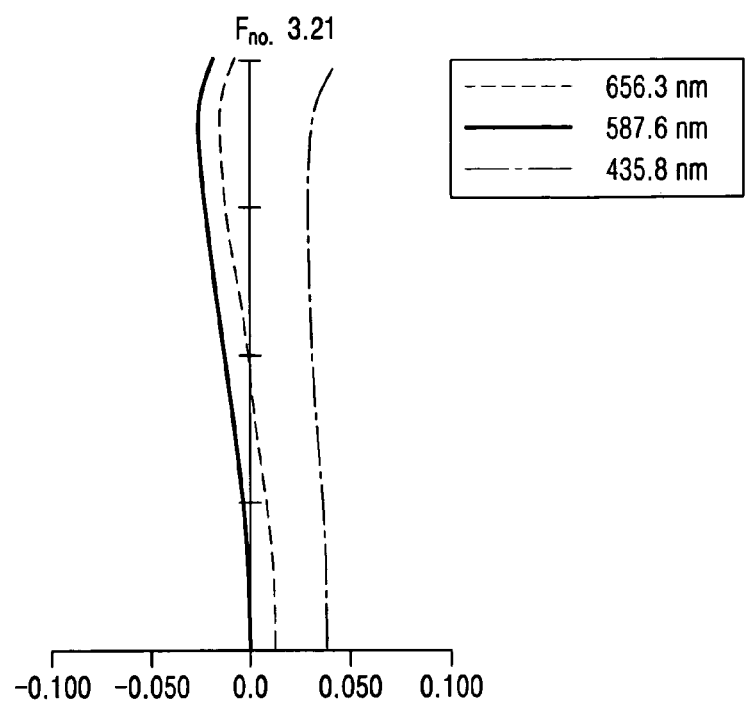
FIGS. 7A-7D illustrate longitudinal spherical aberration, astigmatic field curvature, distortion, and lateral color at the medium angle position of the zoom lens optical system according to the embodiment illustrated in FIGS. 5A and 5B.
Figure 7B:
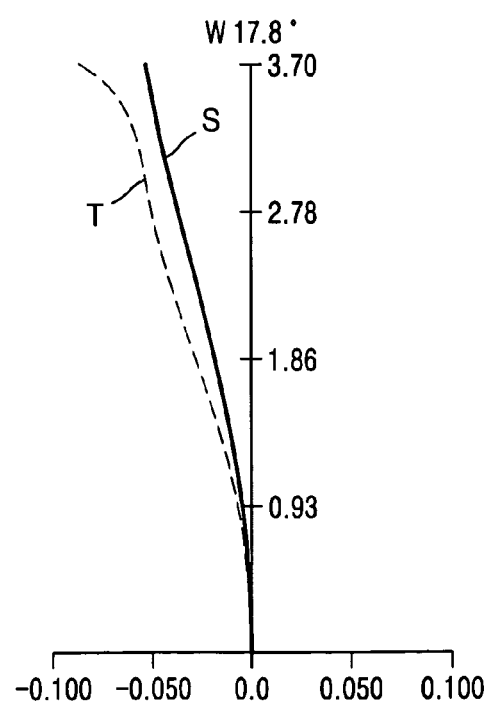
Figure 7C:
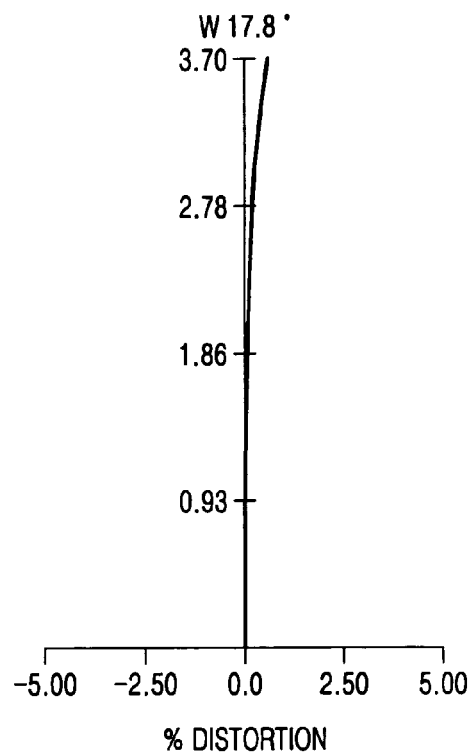
Figure 7D:
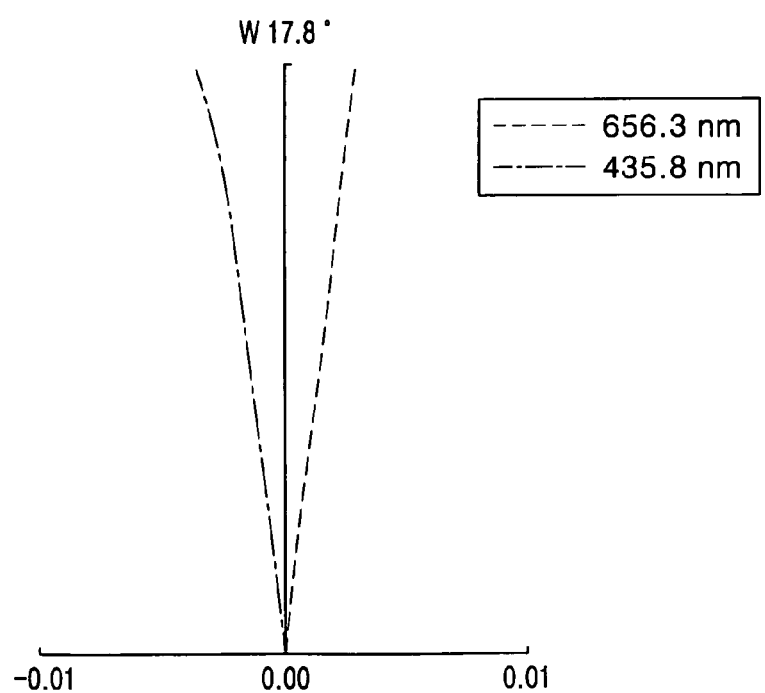
Figure 8A:
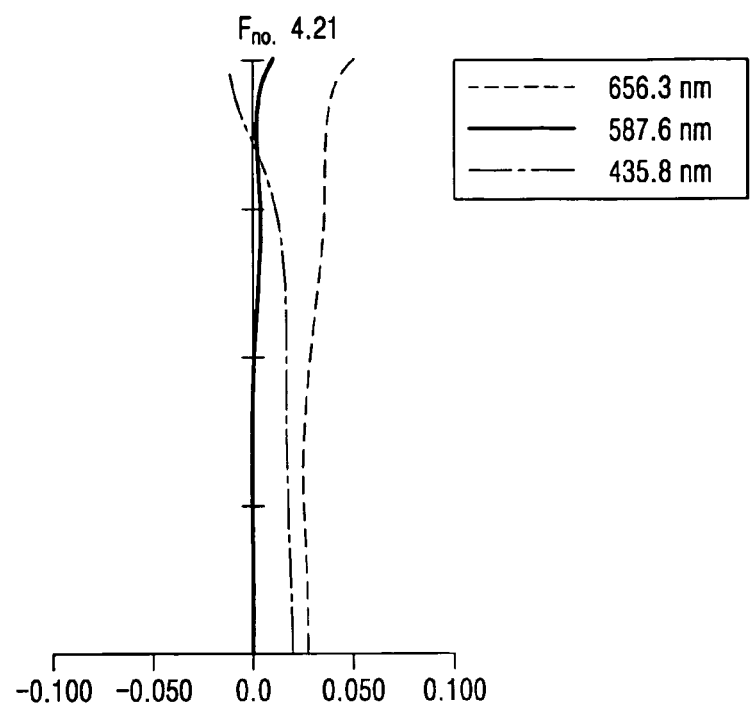
FIGS. 8A-8D illustrate longitudinal spherical aberration, astigmatic field curvature, distortion, and lateral color at the telephoto position of the zoom lens optical system according to the embodiment illustrated in FIGS. 5A and 5B, respectively.
Figure 8B:
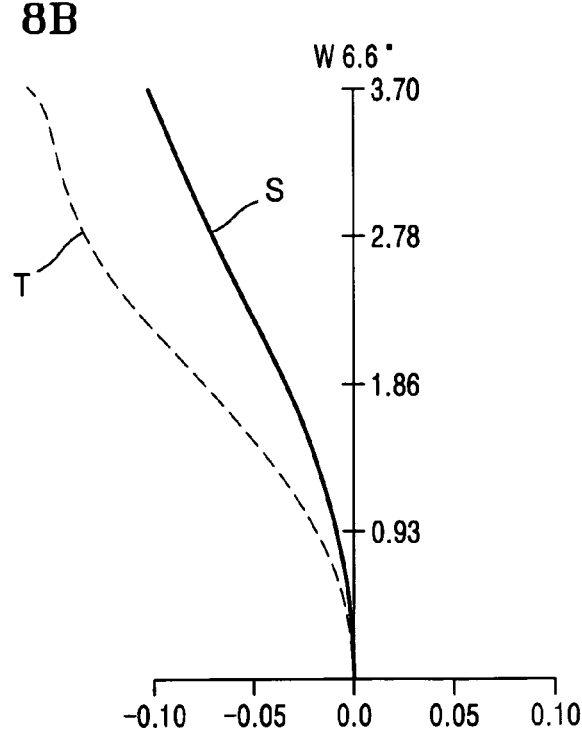
Figure 8C:
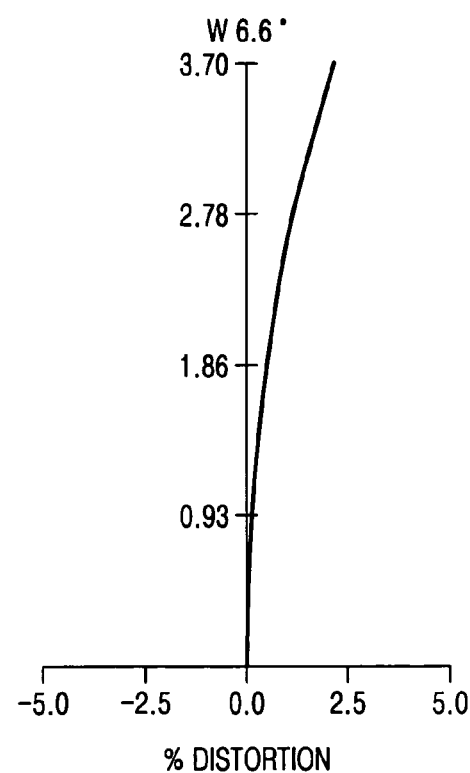
Figure 8D:
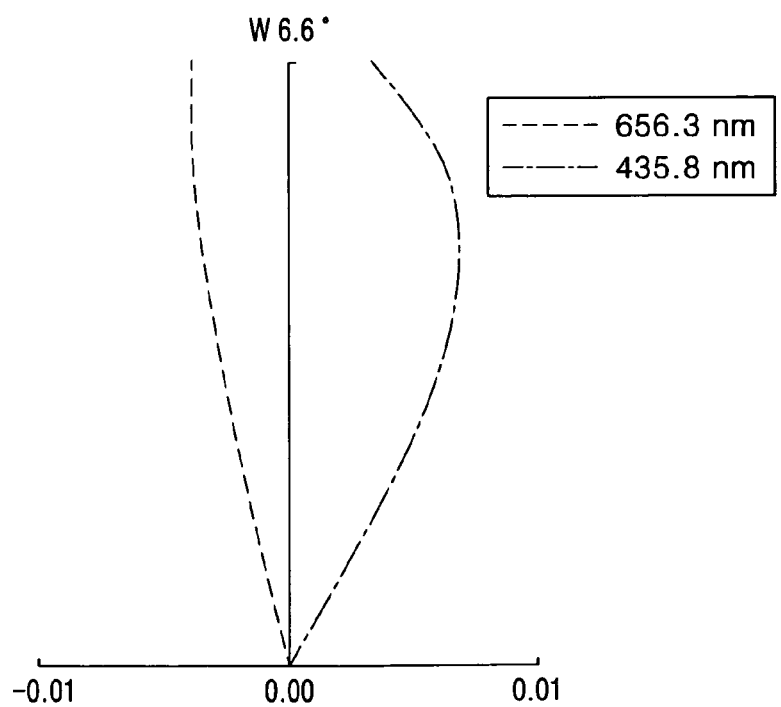

FIG. 5A is a cross-sectional view illustrating the optical arrangement of a zoom lens optical system according to another embodiment of the present invention, and FIG. 5B are cross-sectional views illustrating optical arrangements of the zoom lens optical system of FIG. 5A at a wide angle position, a medium angle position, and a telephoto position, respectively. Referring to FIGS. 5A and 5B, the zoom lens optical system according to the current embodiment includes a first lens group I having a positive refractive power, a second lens group II having a negative refractive power, a third lens group III having a positive refractive power, a fourth lens group IV having a positive refractive power, and a fifth lens group V having a positive refractive power. The zoom lens optical system further includes an aperture stop S that is located between the second and third lens groups II and III and moved together with the third lens group III. In the zoom lens optical system having the above-mentioned configuration, zooming operation of each lens group and the number of lenses in each lens group are substantially the same as in the zoom lens optical system according to the embodiment illustrated in FIGS. 1A and 1B. Tables 4 through 6 provide detailed data on each lens in the zoom lens optical system according to the embodiment illustrated in FIGS. 5A and 5B, such as the radius of curvature, lens thickness or interlens distance, refractive index, dispersion, aspheric coefficients, focal length, and f-number.

TABLE 4

| Surface | R | D | Nd | v d |
|---|---|---|---|---|
| 1 | 33.532 | 1.00 | 1.84666 | 23.8 |
| 2 | 20.576 | 6.84 | 1.70154 | 41.1 |
| 3 | 193.315 | d3 | | |
| 4 | 40.609 | 0.90 | 1.88300 | 41.0 |
| 5 | 8.450 | 2.89 | | |
| 6 | 239.555 | 1.00 | 1.80500 | 40.7 |
| 7 | 7.171 | 1.58 | | |
| 8 | 12.764 | 2.96 | 1.84666 | 23.8 |
| 9 | −25.516 | 0.57 | | |
| 10 | −14.295 | 0.80 | 1.77250 | 49.6 |
| 11 | −1129.831 | d11 | | |
| S | Aperture stop | 0.50 | | |
| 13 | 8.612 | 2.58 | 1.58913 | 61.3 |
| 14 | −59.694 | 0.10 | | |
| 15 | 11.938 | 3.23 | 1.49700 | 81.6 |
| 16 | 28.610 | 1.00 | 1.84666 | 23.8 |
| 17 | 6.726 | 0.83 | | |
| 18 | 46.366 | 1.83 | 1.48749 | 70.4 |
| 19 | −20.554 | d19 | | |
| 20 | 11.190 | 2.25 | 1.48749 | 70.4 |
| 21 | 189.108 | d21 | | |
| 22 | 9.698 | 1.95 | 1.51503 | 63.0 |
| 23 | 17.552 | d23 | | |
| 24 | ∞ | 1.22 | 1.51680 | 64.2 |
| 25 | ∞ | fb | | |

TABLE 5

| Surface | K | A | B | C | D |
|---|---|---|---|---|---|
| 7 | −1.00 | −5.86877E−05 | −5.58973E−07 | 3.10400E−08 | −4.09680E−10 |
| 13 | −1.00 | −1.27419E−04 | 8.92175E−07 | −2.08332E−07 | −2.51431E−09 |
| 14 | −1.00 | −1.25741E−04 | 2.03240E−06 | −3.92871E−07 | 4.80844E−09 |
| 21 | −1.00 | 2.34097E−05 | 1.65895E−06 | −1.88728E−07 | 5.56194E−09 |

TABLE 6

| Variable distance | Wide angle position | Medium angle position | Telephoto position |
|---|---|---|---|
| f | 4.16 | 11.50 | 32.01 |
| Fno. | 2.87 | 3.21 | 4.12 |
| d3 | 1.500 | 15.267 | 31.226 |
| d11 | 16.759 | 5.723 | 1.000 |
| d19 | 1.000 | 3.462 | 1.000 |
| d21 | 3.033 | 8.103 | 17.236 |
| d23 | 2.577 | 4.181 | 4.413 |
| fb | 1.100 | 1.100 | 1.100 |

FIGS. 6A-6D, respectively, illustrate longitudinal spherical aberration, astigmatic field curvature, distortion, and lateral color at the wide angle position of the zoom lens optical system according to the current embodiment of the present invention. FIGS. 7A-7D, respectively, illustrate longitudinal spherical aberration, astigmatic field curvature, distortion, and lateral color at the medium angle position thereof. FIGS. 8A-8D, respectively, illustrate longitudinal spherical aberration, astigmatic field curvature, distortion, and lateral color at the telephoto position of the zoom lens optical system according to the current embodiment of the present invention.

Figure 9A:
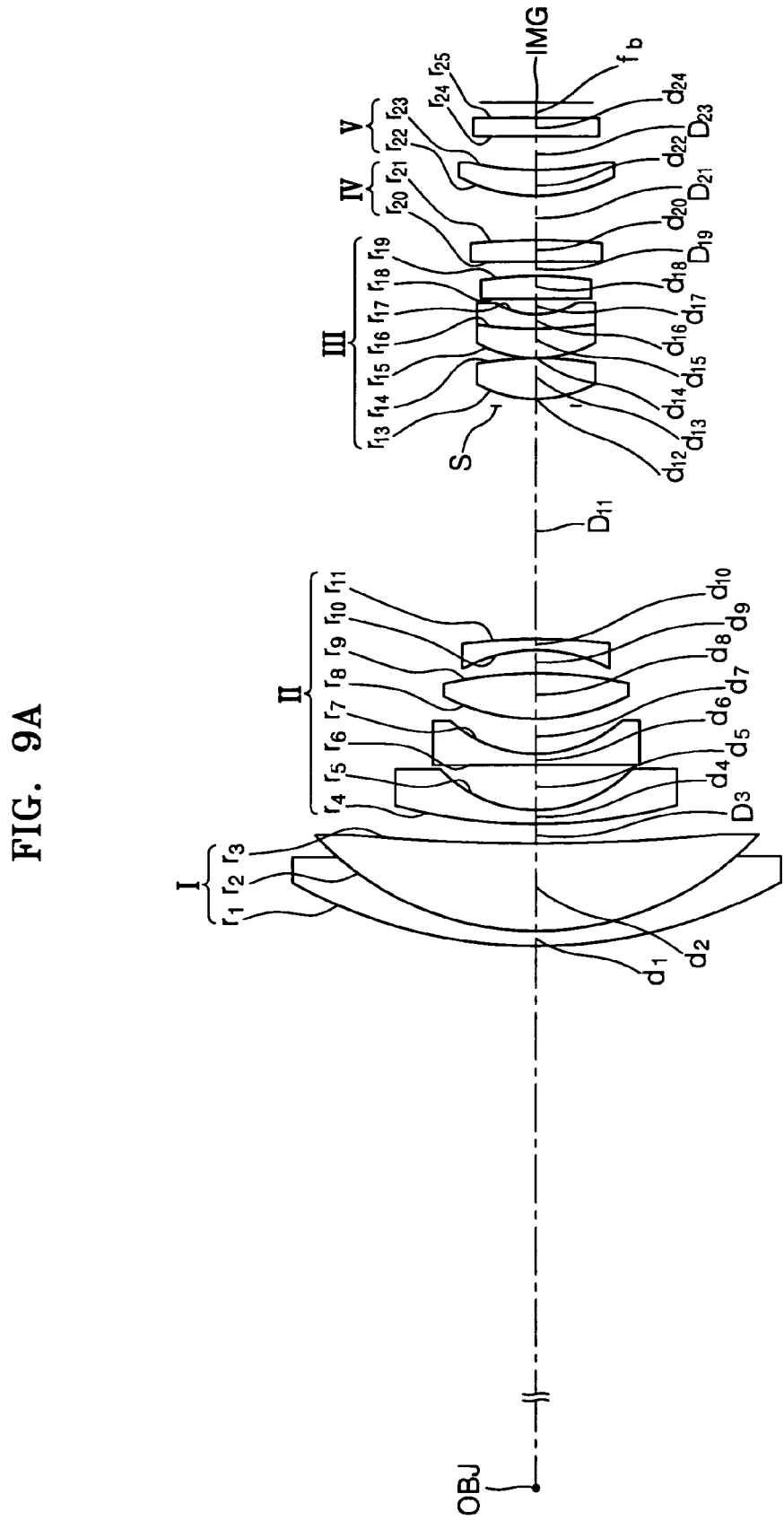
FIG. 9A is a cross-sectional view illustrating the optical arrangement of a zoom lens optical system according to another embodiment of the present invention.
Figure 9B:
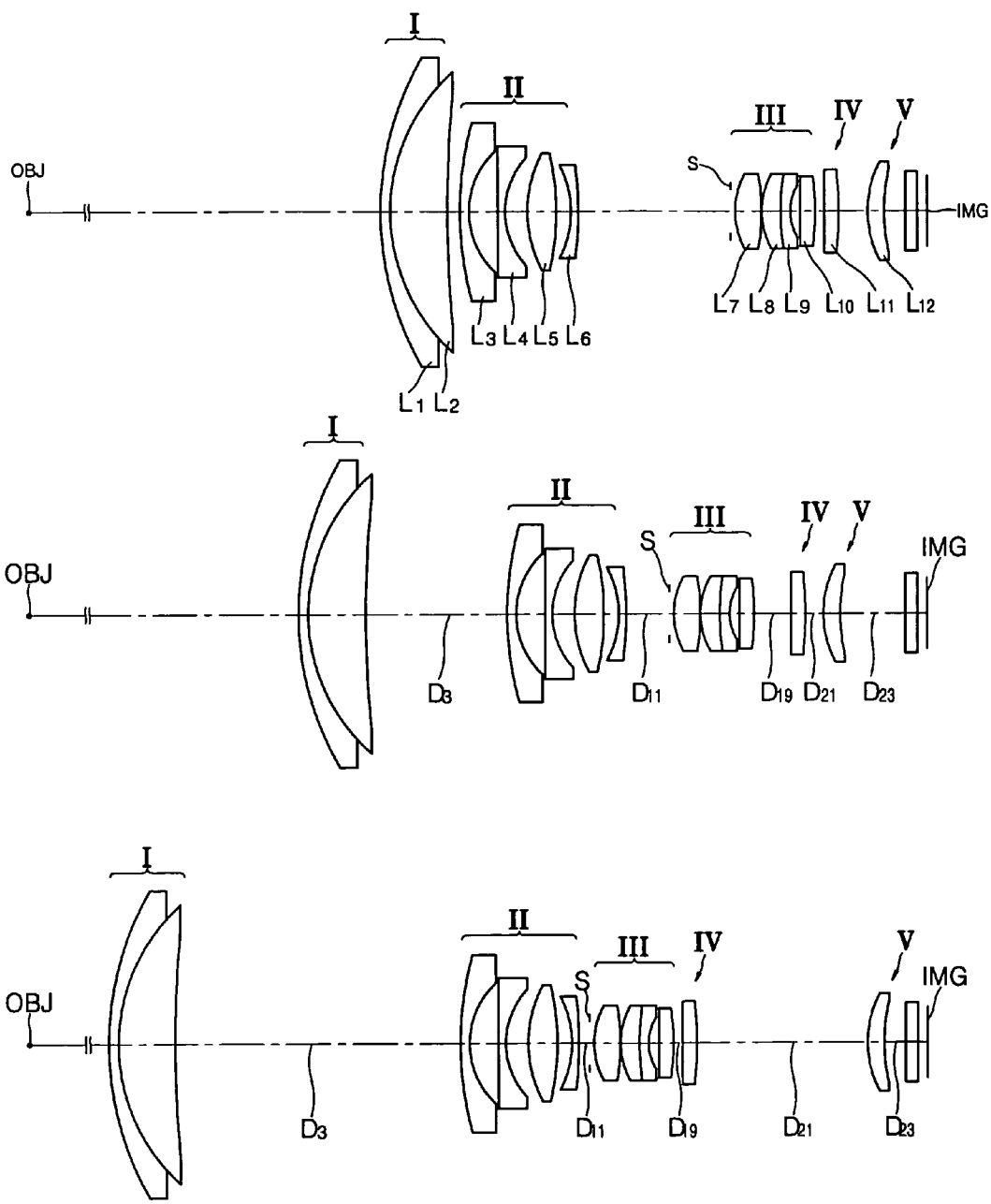
FIG. 9B are cross-sectional views illustrating optical arrangements of the zoom lens optical system of FIG. 9A at a wide angle position, a medium angle position, and a telephoto position, respectively.
Figure 10A:
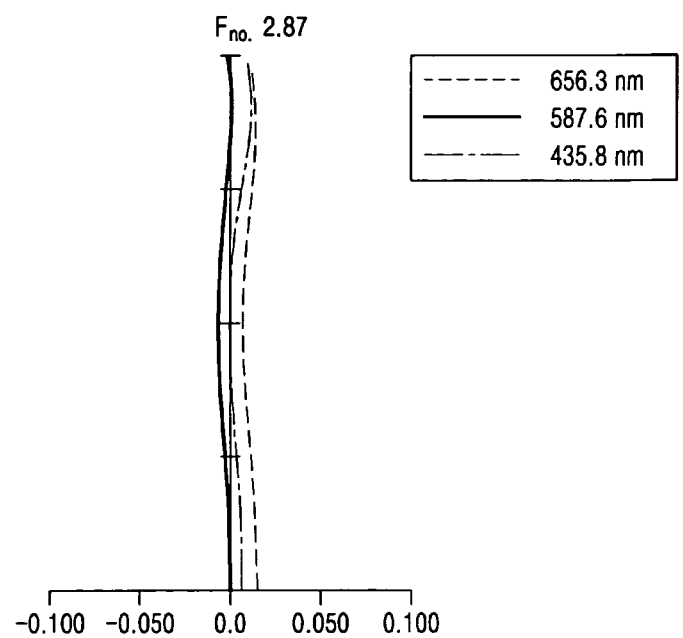
FIGS. 10A-10D illustrate longitudinal spherical aberration, astigmatic field curvature, distortion, and lateral color at the wide angle position of the zoom lens optical system according to the embodiment illustrated in FIGS. 9A and 9B, respectively.
Figure 10B:
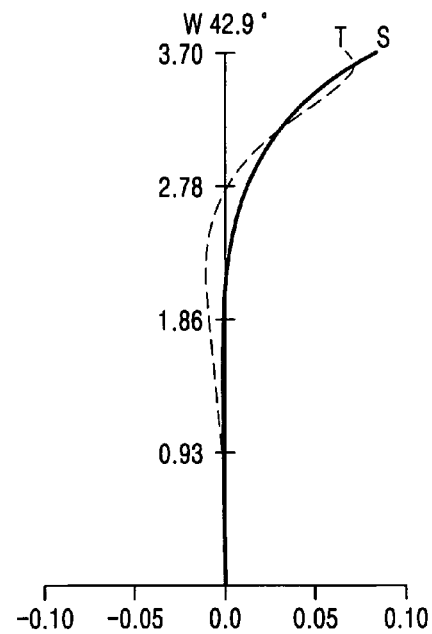
Figure 10C:
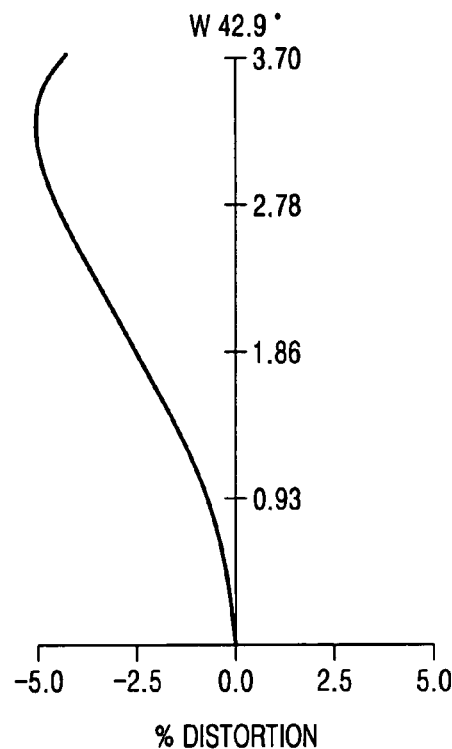
Figure 10D:
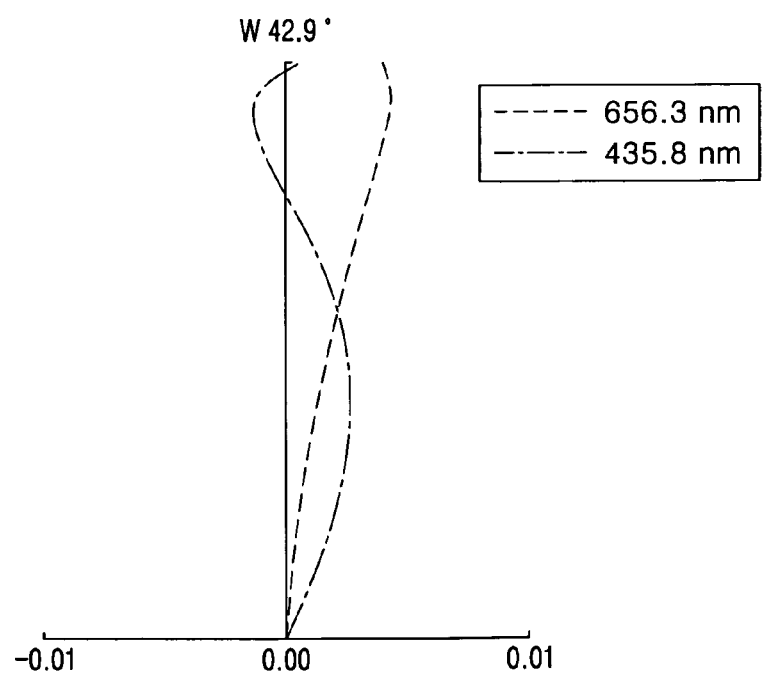
Figure 11A:
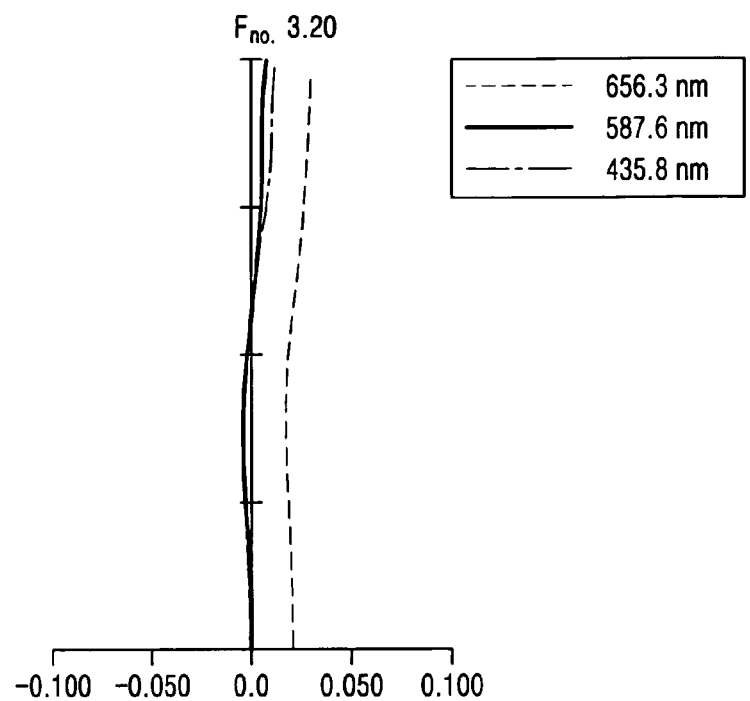
FIGS. 11A-11D illustrate longitudinal spherical aberration, astigmatic field curvature, distortion, and lateral color at the medium angle position of the zoom lens optical system according to the embodiment illustrated in FIGS. 9A and 9B, respectively.
Figure 11B:
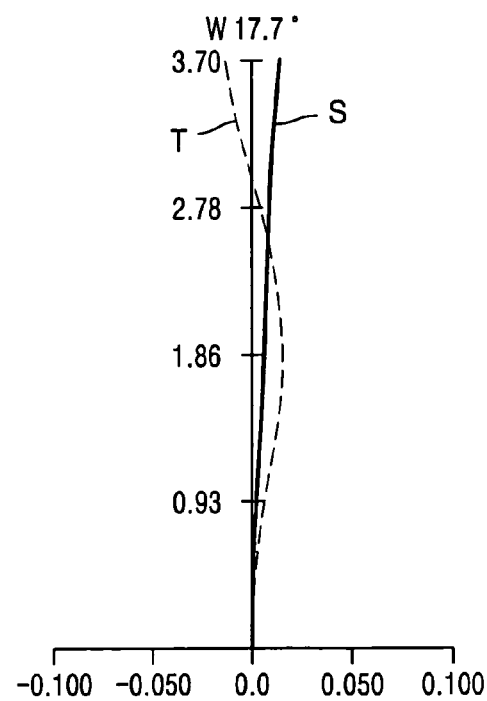
Figure 11C:
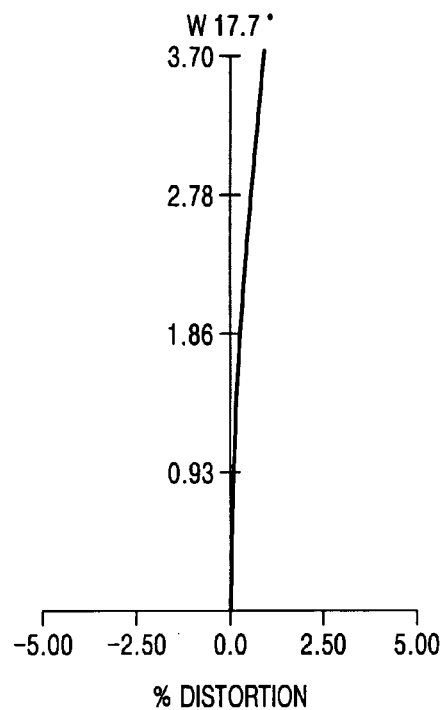
Figure 11D:
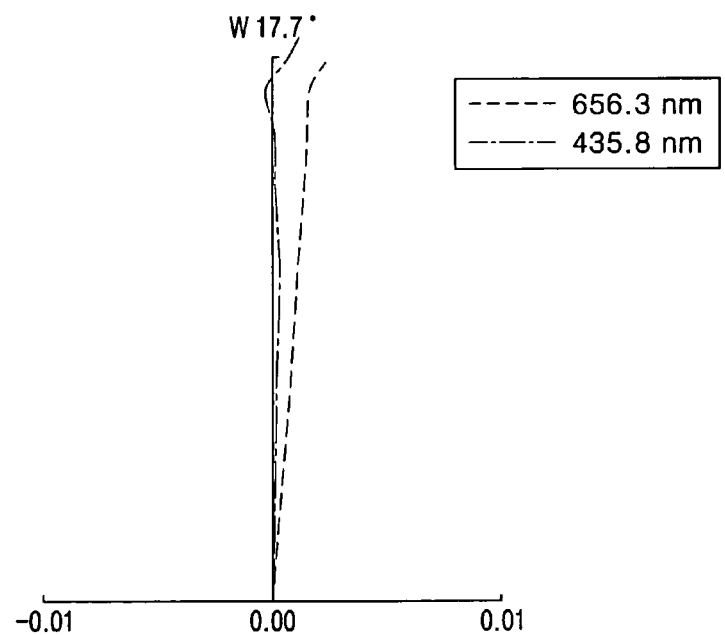
Figure 12A:
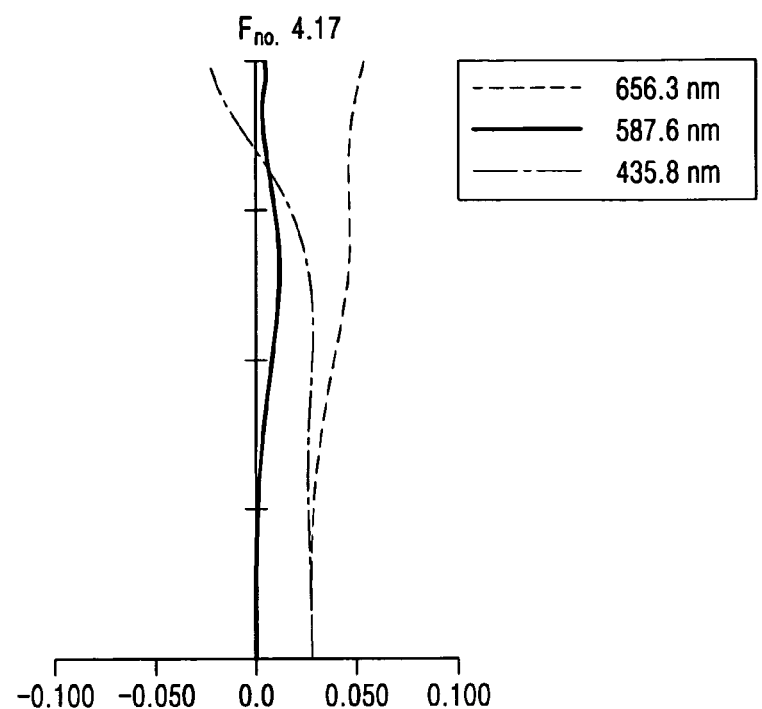
FIGS. 12A-12D illustrate longitudinal spherical aberration, astigmatic field curvature, distortion, and lateral color at the telephoto position of the zoom lens optical system according to the embodiment illustrated in FIGS. 9A and 9B, respectively.
Figure 12B:
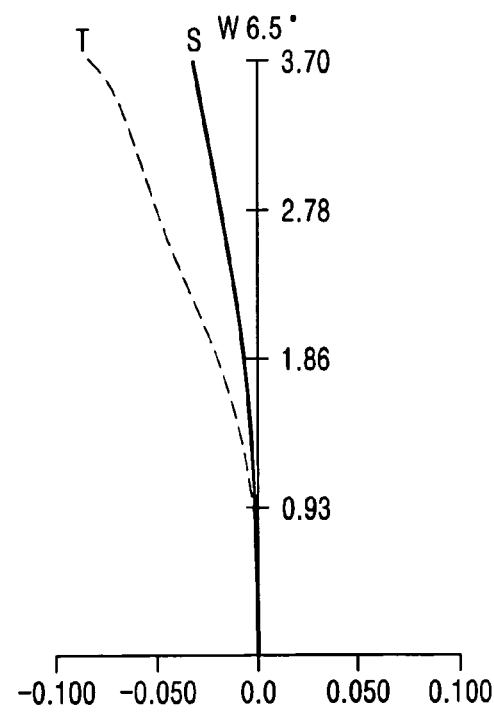
Figure 12C:
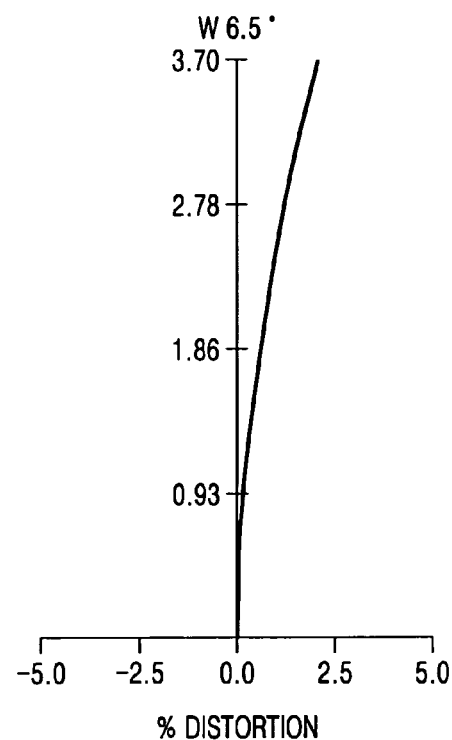
Figure 12D:
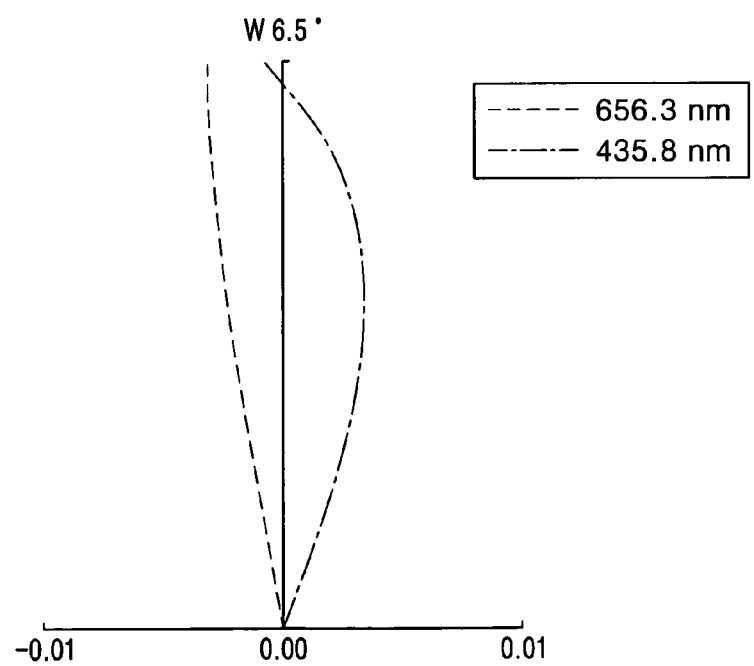

FIG. 9A is a cross-sectional view illustrating the optical arrangement of a zoom lens optical system according to another embodiment of the present invention. FIG. 9B are cross-sectional views illustrating optical arrangements of the zoom lens optical system of FIG. 9A at a wide angle position, a medium angle position, and a telephoto position, respectively. Referring to FIGS. 9A and 9B, the zoom lens optical system according to the present embodiment includes first through fifth lens groups I through V having positive, negative, positive, positive, and positive refractive powers, respectively, arranged sequentially from an object side OBJ.

In the zoom lens optical system having the above-mentioned configuration, zooming operation of each lens group and the number of lenses in each lens group are substantially the same as in the zoom lens optical system according to the embodiment illustrated in FIGS. 1A and 1B. Tables 7 through 9 provide detailed data on each in the zoom lens optical system according to the embodiment illustrated in FIGS. 9A and 9B, such as the radius of curvature, lens thickness or interlens distance, refractive index, aspheric coefficients for an aspherical lens, dispersion, focal length, and f-number.

TABLE 7

| Surface | R | D | $N_d$ | $v_d$ |
|---|---|---|---|---|
| 1 | 35.373 | 1.00 | 1.84666 | 23.8 |
| 2 | 22.035 | 6.30 | 1.72000 | 43.7 |
| 3 | 171.286 | d3 | | |
| 4 | 44.699 | 0.90 | 1.88300 | 41.0 |
| 5 | 9.140 | 3.12 | | |
| 6 | 300.000 | 1.00 | 1.80500 | 40.7 |
| 7 | 7.899 | 2.63 | | |
| 8 | 15.539 | 3.17 | 1.84666 | 23.8 |
| 9 | −21.981 | 1.46 | | |
| 10 | −11.663 | 0.80 | 1.83481 | 42.8 |
| 11 | −68.219 | d11 | | |
| S | Aperture stop | 0.50 | | |
| 13 | 8.834 | 2.76 | 1.68864 | 52.1 |
| 14 | −30.817 | 0.10 | | |
| 15 | 9.956 | 2.17 | 1.49700 | 81.6 |
| 16 | 45.581 | 1.00 | 1.84666 | 23.8 |
| 17 | 6.085 | 0.89 | | |
| 18 | 51.343 | 1.80 | 1.48749 | 70.2 |
| 19 | −17.886 | d19 | | |
| 20 | −537.710 | 1.58 | 1.51633 | 64.2 |
| 21 | −32.645 | d21 | | |
| 22 | 12.140 | 1.93 | 1.51503 | 63.0 |
| 23 | 29.136 | d23 | | |
| 24 | ∞ | 1.22 | 1.51680 | 64.2 |
| 25 | ∞ | fb | | |

TABLE 8

| Surface | K | A | B | C | D |
|---|---|---|---|---|---|
| 7 | −1.00 | −9.55241E−05 | −9.28843E−07 | 1.60397E−08 | −2.48322E−10 |
| 13 | −1.00 | 2.81402E−05 | −1.49134E−05 | 9.51461E−07 | −2.72534E−08 |
| 14 | −1.00 | 1.35614E−04 | −1.85925E−05 | 1.18108E−06 | −3.43964E−08 |
| 21 | −1.00 | 4.10091E−05 | 5.96478E−06 | −3.20760E−07 | 8.47638E−09 |

TABLE 9

| Variable distance | Wide angle position | Medium angle position | Telephoto position |
|---|---|---|---|
| f | 4.16 | 11.51 | 32.02 |
| Fno. | 2.87 | 3.20 | 4.17 |
| d3 | 1.500 | 15.672 | 31.650 |
| d11 | 16.704 | 4.673 | 1.000 |
| d19 | 1.000 | 4.122 | 1.000 |
| d21 | 3.037 | 1.970 | 18.591 |
| d23 | 2.325 | 7.042 | 2.329 |
| fb | 1.100 | 1.100 | 1.100 |

FIGS. 10A-10D, respectively, illustrate longitudinal spherical aberration, astigmatic field curvature, distortion, and lateral color at the wide angle position of the zoom lens optical system according to the embodiment illustrated in FIGS. 9A and 9B. FIGS. 11A-11D, respectively, illustrate longitudinal spherical aberration, astigmatic field curvature, distortion, and lateral color at the medium angle position thereof. FIGS. 12A-12D, respectively, illustrate longitudinal spherical aberration, astigmatic field curvature, distortion, and lateral color at the telephoto position thereof.

Figure 13A:
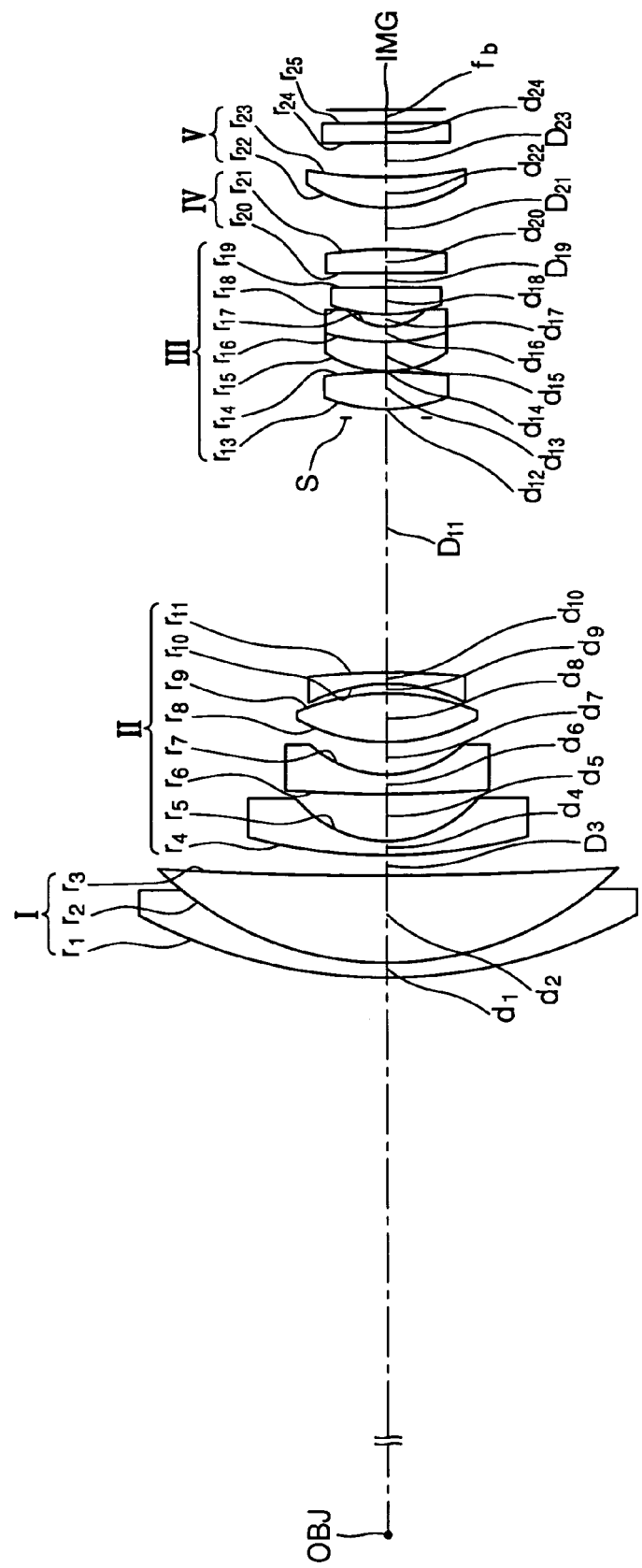
FIG. 13A is a cross-sectional view illustrating the optical arrangement of a zoom lens optical system according to another embodiment of the present invention.
Figure 13B:
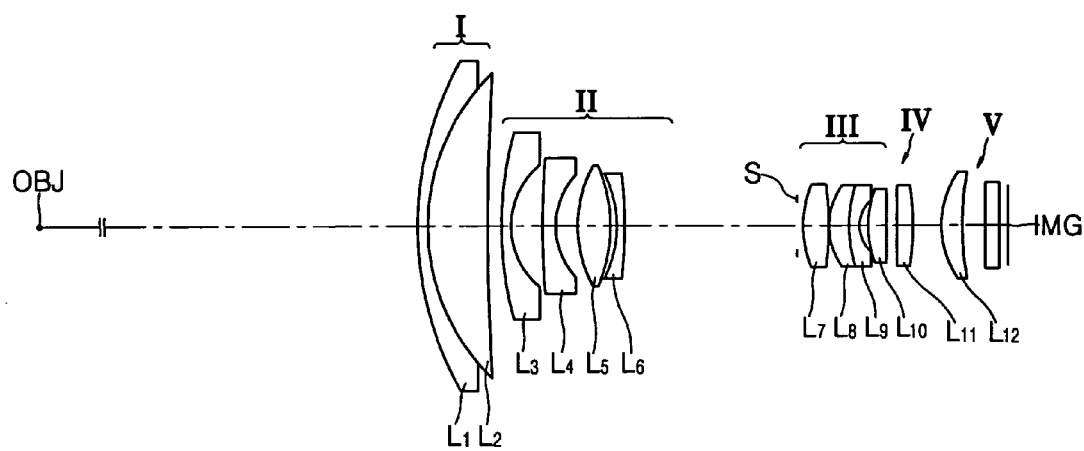
FIG. 13B are cross-sectional views illustrating optical arrangements of the zoom lens optical system of FIG. 13A at a wide angle position, a medium angle position, and a telephoto position, respectively.
Figure 13B:
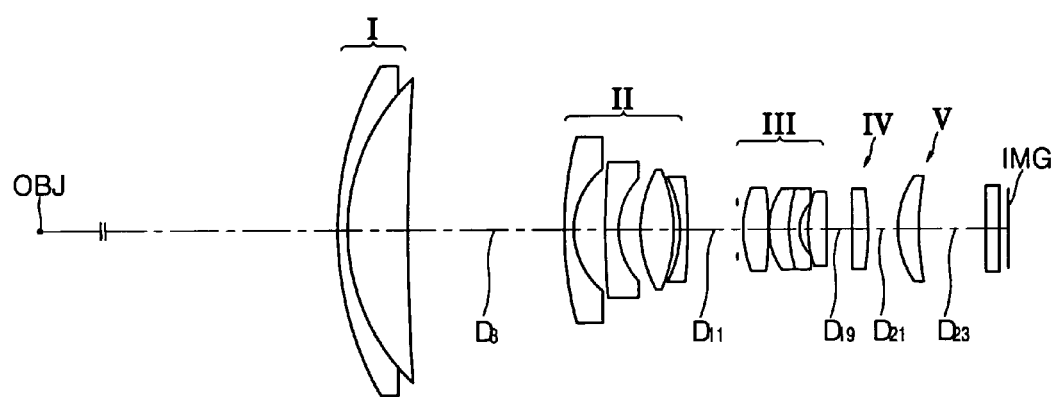
Figure 13B:
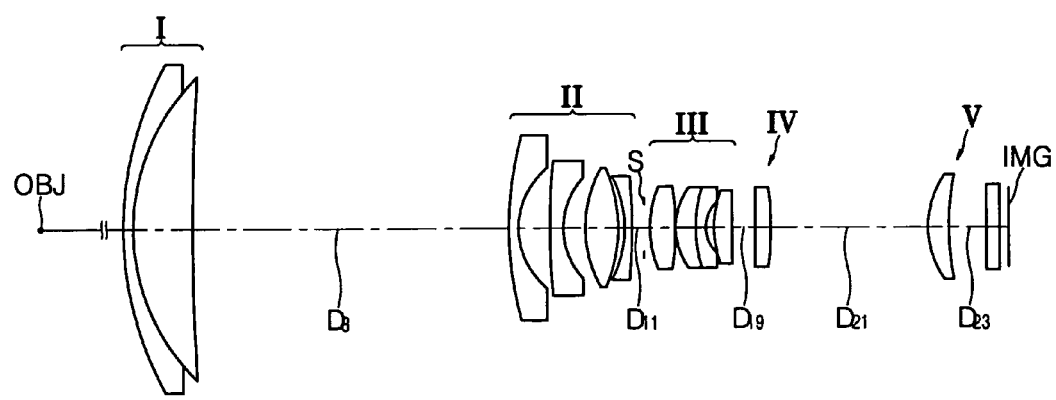
Figure 14A:
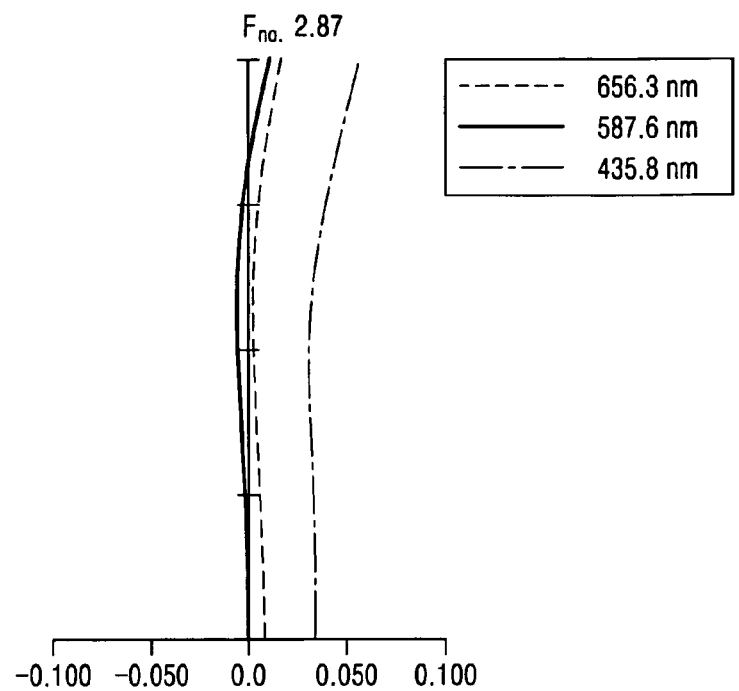
FIGS. 14A-14D illustrate longitudinal spherical aberration, astigmatic field curvature, distortion, and lateral color at the wide angle position of the zoom lens optical system according to the embodiment illustrated in FIGS. 13A and 13B, respectively.
Figure 14B:
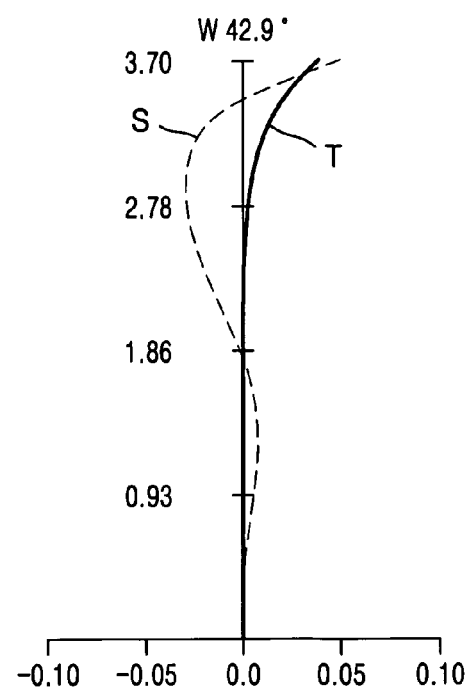
Figure 14C:
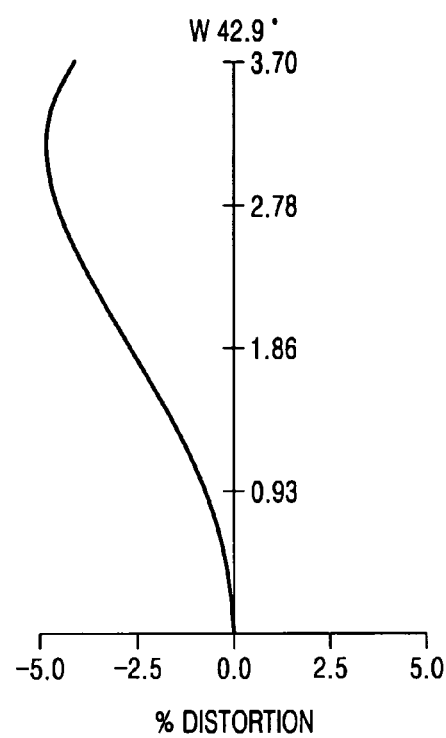
Figure 14D:
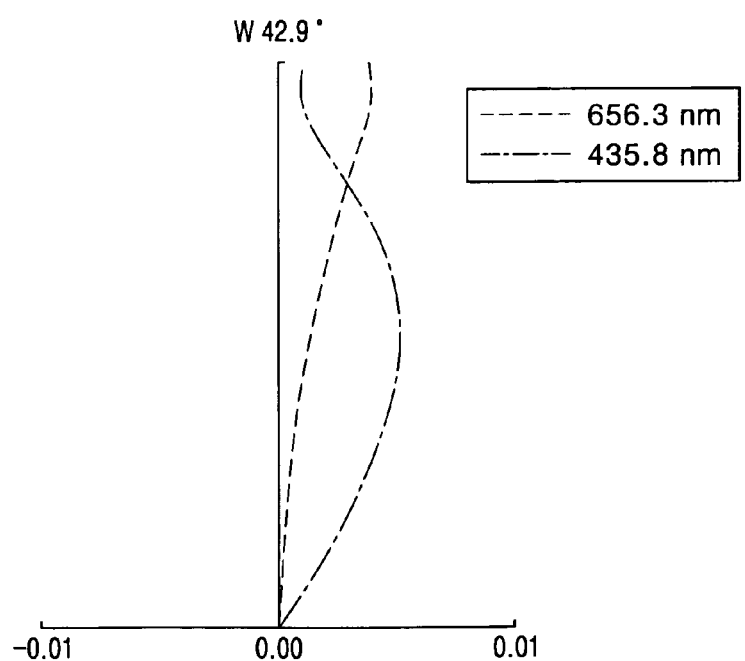
Figure 15A:
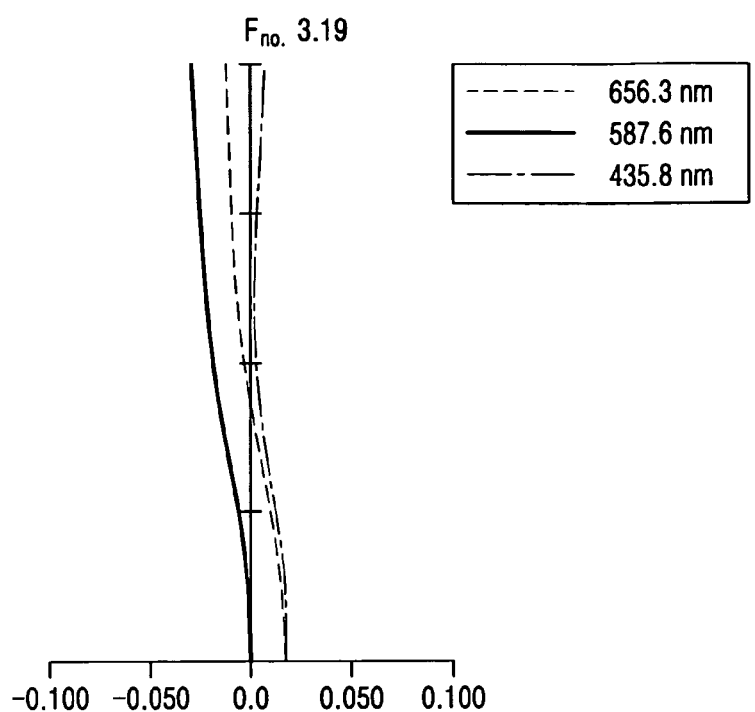
FIGS. 15A-15D illustrate longitudinal spherical aberration, astigmatic field curvature, distortion, and lateral color at the medium angle position of the zoom lens optical system according to the embodiment illustrated in FIGS. 13A and 13B, respectively.
Figure 15B:
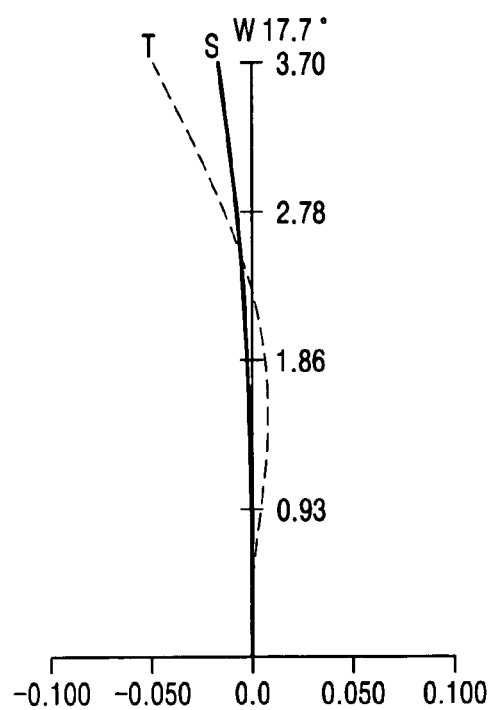
Figure 15C:
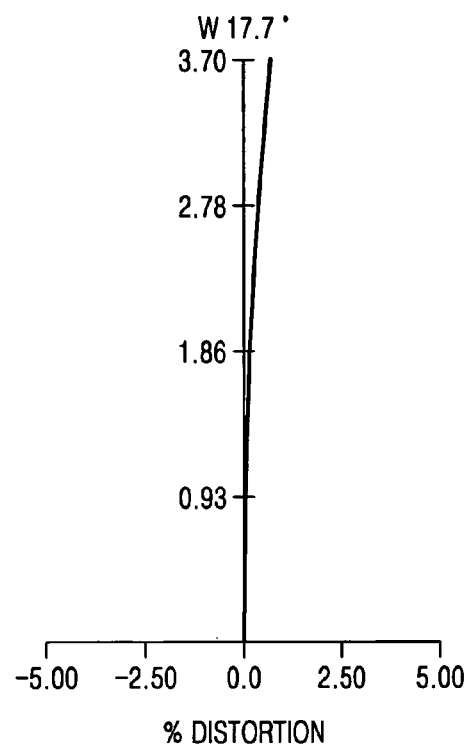
Figure 15D:
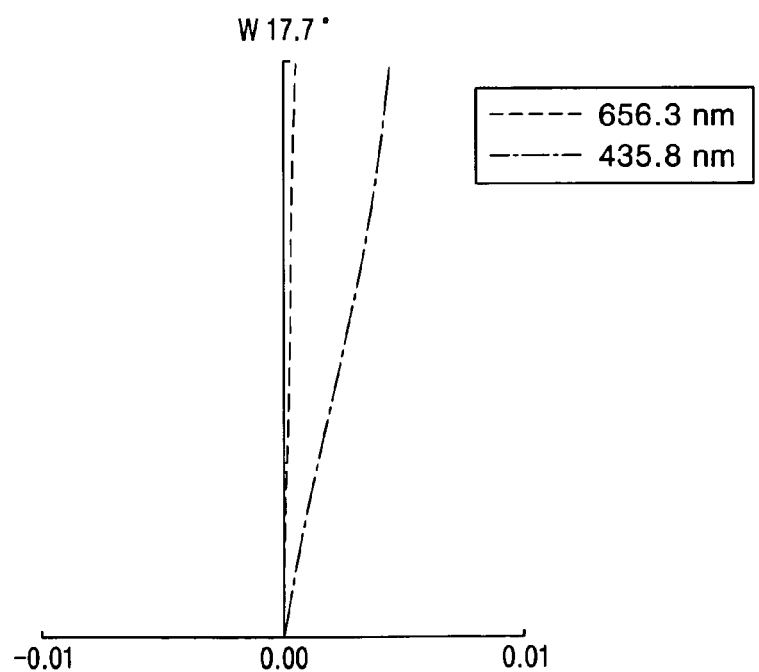
Figure 16A:
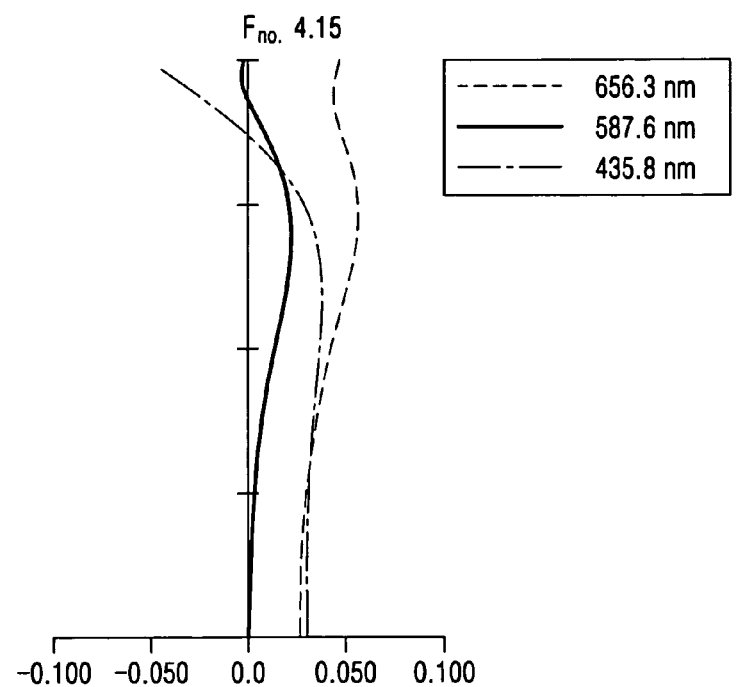
FIGS. 16A-16D illustrate longitudinal spherical aberration, astigmatic field curvature, distortion, and lateral color at the telephoto position of the zoom lens optical system according to the embodiment illustrated in FIGS. 13A and 13B, respectively.
Figure 16B:
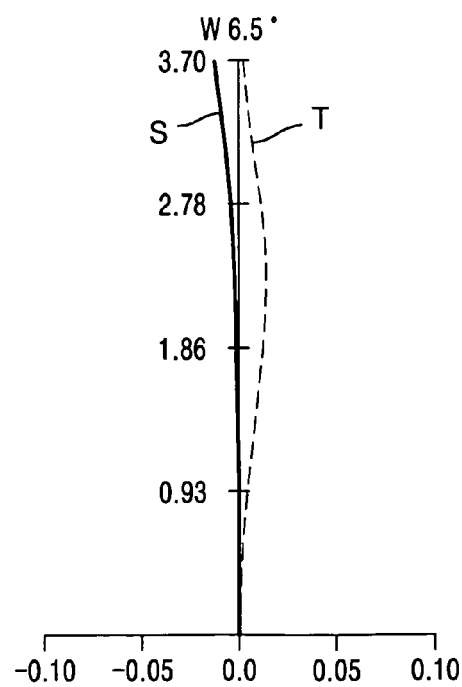
Figure 16C:
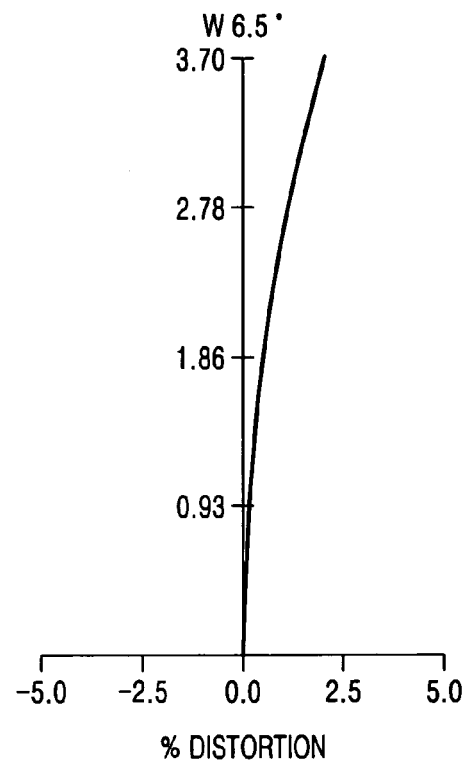
Figure 16D:
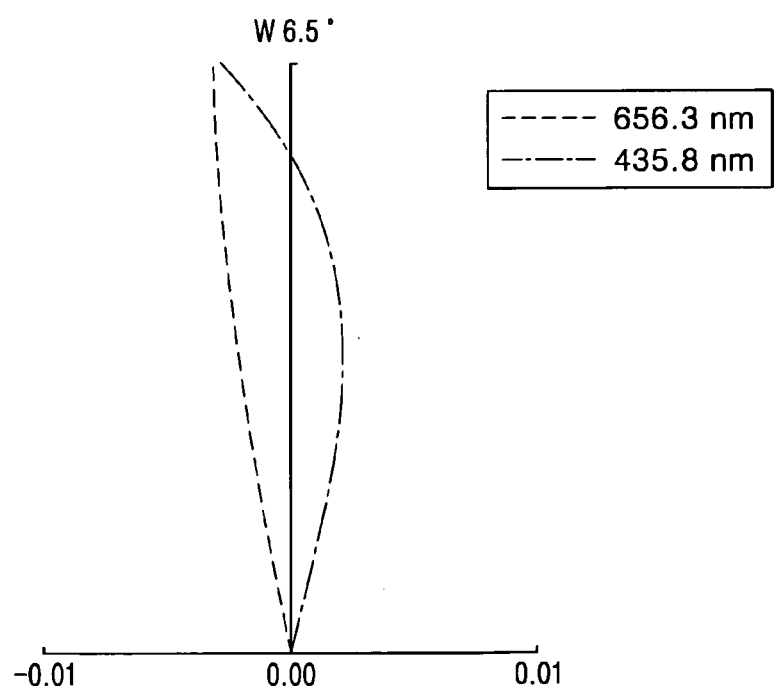

FIG. 13A is a cross-sectional view illustrating the optical arrangement of a zoom lens optical system according to another embodiment of the present invention. FIG. 13B are cross-sectional views illustrating optical arrangements of the zoom lens optical system of FIG. 13A at a wide angle position, a medium angle position, and a telephoto position, respectively. Referring to FIGS. 13A and 13B, the zoom lens optical system includes first through fifth lens groups I through V having positive, negative, positive, positive, and positive refractive powers, respectively, arranged sequentially from an object side OBJ.

In the zoom lens optical system having the above-mentioned configuration, zooming operation of each lens group and the number of lenses in each lens group are substantially the same as in the zoom lens optical system according to the embodiment illustrated in FIGS. 1A and 1B. Tables 10 through 12 provide detailed data on each in the zoom lens optical system according to the current embodiment, such as the radius of curvature, lens thickness or interlens distance, refractive index, aspheric coefficients for an aspherical lens, dispersion, focal length, and f-number.

TABLE 10

| Surface | R | D | Nd | v d |
|---|---|---|---|---|
| 1 | 36.011 | 1.00 | 1.84666 | 23.8 |
| 2 | 22.710 | 6.05 | 1.74400 | 44.8 |
| 3 | 150.806 | d3 | | |
| 4 | 37.052 | 0.90 | 1.88300 | 41.0 |
| 5 | 8.516 | 3.34 | | |
| 6 | 226.406 | 1.32 | 1.80500 | 40.7 |
| 7 | 7.407 | 2.22 | | |
| 8 | 13.788 | 3.19 | 1.84666 | 23.8 |
| 9 | −19.296 | 0.69 | | |
| 10 | −13.131 | 0.80 | 1.88300 | 41.0 |
| 11 | −192.699 | d11 | | |
| S | Aperture stop | 0.50 | | |
| 13 | 7.807 | 2.77 | 1.58289 | 58.9 |
| 14 | −66.067 | 0.10 | | |
| 15 | 8.534 | 2.09 | 1.49700 | 81.6 |
| 16 | 17.439 | 1.00 | 1.84666 | 23.8 |
| 17 | 5.357 | 0.67 | | |
| 18 | 9.960 | 2.00 | 1.48749 | 70.4 |
| 19 | −60.622 | d19 | | |
| 20 | −307.699 | 1.50 | 1.51503 | 63.0 |
| 21 | −53.481 | d21 | | |
| 22 | 10.632 | 1.98 | 1.48749 | 70.4 |
| 23 | 23.583 | d23 | | |
| 24 | ∞ | 1.22 | 1.51680 | 64.2 |
| 25 | ∞ | fb | | |

TABLE 11

| Surface | K | A | B | C | D |
|---|---|---|---|---|---|
| 7 | −1.00 | −2.24018E−05 | −2.12428E−06 | 2.72297E−08 | −1.84796E−10 |
| 13 | −1.00 | 2.23437E−05 | −5.44296E−06 | 7.08038E−08 | −5.56640E−09 |
| 14 | −1.00 | −1.26217E−05 | −4.78212E−06 | −1.14776E−07 | 4.28178E−10 |
| 21 | −1.00 | 1.47388E−04 | −1.15874E−05 | 1.06860E−06 | −5.19872E−08 |

TABLE 12

| Variable distance | Wide angle position | Medium angle position | Telephoto position |
| --- | --- | --- | --- |
| f | 4.14 | 11.50 | 32.04 |
| Fno. | 2.87 | 3.20 | 4.16 |
| d3 | 1.502 | 16.013 | 31.946 |
| d11 | 17.624 | 5.282 | 1.500 |
| d19 | 1.000 | 2.435 | 2.129 |
| d21 | 3.035 | 3.219 | 16.279 |
| d23 | 2.398 | 6.777 | 3.715 |
| fb | 1.100 | 1.100 | 1.100 |

FIGS. 14A-14D illustrate longitudinal spherical aberration, astigmatic field curvature, distortion, and lateral color at the wide angle position of the zoom lens optical system according to the embodiment illustrated in FIGS. 13A and 13B. FIGS. 15A-15D illustrate longitudinal spherical aberration, astigmatic field curvature, distortion, and lateral color at the medium angle position thereof. FIGS. 16A-16D illustrate longitudinal spherical aberration, astigmatic field curvature, distortion, and lateral color at the telephoto position thereof.

Table 13 shows values in the Equations (1) through (6) in the above embodiments.

TABLE 13

| | Embodiment 1 | Embodiment 2 | Embodiment 3 | Embodiment 4 |
| --- | --- | --- | --- | --- |
| Equation (1) | 1.77250 | 1.70154 | 1.72000 | 1.74400 |
| Equation (2) | −0.60 | −0.63 | −0.61 | −0.60 |
| Equation (4): $N_{III\_L8}$ | 1.49700 | 1.49700 | 1.49700 | 1.49700 |
| Equation (4): $v_{III\_L8}$ | 81.60 | 81.60 | 81.60 | 81.60 |
| Equation (5) | 0.014 | 0.171 | 0.062 | 0.033 |
| $f_W$ | 4.147 | 4.153 | 4.160 | 4.143 |
| $f_{II}$ | −6.941 | −6.639 | −6.825 | −6.946 |
| $f_{IV}$ | 300.017 | 24.215 | 66.989 | 124.962 |

A zoom lens optical system configured as above includes first through fifth lens groups having positive, negative, positive, positive, and positive refractive powers and the first lens group includes a doublet of two lenses, thus achieving a compact design, an ultrawide angle of view (half field angle of about 43°), and a high zooming ratio of about 8× that can be used in a solid photographing device such as a CCD with a small pixel pitch. The zoom lens optical system can also cover a range of a common focal length of 24 mm to 200 mm from ultrawide angle to telephoto in 35 mm format. As evident from the diagrams illustrating aberrations, it is possible to effectively correct spherical aberrations, astigmatic field curvature, percent distortion, and color aberrations such as lateral color.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A zoom lens optical system comprising:
a first lens group having a positive refractive power and consisting of two lens elements;
a second lens group having a negative refractive power;
a third lens group having a positive refractive power;
a fourth lens group having a positive refractive power; and
a fifth lens group having a positive refractive power,
wherein the first through fifth lens groups are sequentially arranged from an object side and the first lens group is moved during zooming from a wide angle position to a telephoto position.

2. The zoom lens optical system of claim 1, wherein the first lens group includes a first lens element having a negative refractive power and a second lens element having a positive refractive power.

3. The zoom lens optical system of claim 2, wherein the first and second lens elements are cemented together to form a doublet.

4. The zoom lens optical system of claim 2, wherein a refractive index $N_{I\_L2}$ of the second lens element satisfies $1.65 < N_{I\_L2} < 1.8$.

5. The zoom lens optical system of claim 1, wherein during zooming from the wide angle position to the telephoto position, a distance between the first and second lens groups is increased, a distance between the second and third lens groups is decreased and a distance between the fourth and fifth lens groups is increased.

6. The zoom lens optical system of claim 1, wherein the third lens group includes a first positive lens having a positive refractive power, a positive/negative doublet consisting of a second positive lens having a positive refractive power and a negative lens having a negative refractive power and a third positive lens having a positive refractive power sequentially arranged from the object side.

7. The zoom lens optical system of claim 6, wherein the first positive lens is a double convex lens, the second positive lens is a lens having a convex surface directed toward the object side, and the negative lens is a lens having a concave surface directed toward an image side.

8. The zoom lens optical system of claim 6, wherein a refractive index $N_{III\_L8}$ of the second positive lens in the third lens group satisfies $N_{III\_L8} < 1.5$ and an Abbe number $v_{III\_L8}$ of the second positive lens satisfies $v_{III\_L8} > 80$.

9. The zoom lens optical system of claim 1, wherein each of the first through fifth lens groups is moved during zooming from the wide angle position to the telephoto position.

10. The zoom lens optical system of claim 1, wherein the fifth lens group includes a single lens.

11. The zoom lens optical system of claim 10, wherein the fifth lens group is moved convexly toward the object side during zooming from the wide angle position to the telephoto position.

12. The zoom lens optical system of claim 1, wherein when $f_W$ and $f_{IV}$ are the overall focal length at the wide angle position and the focal length of the fourth lens group IV, respectively, the fourth lens group satisfies $0<f_W/f_{IV}<0.20$.

13. The zoom lens optical system of claim 1, wherein when $f_W$ and $f_{II}$ are the overall focal length at the wide angle position and the focal length of the second lens group II, respectively, the second lens group satisfies $-0.90<f_W/f_{II}<-0.50$.

14. A zoom lens optical system comprising:
a first lens group having a positive refractive power;
a second lens group having a negative refractive power;
a third lens group with a positive refractive power and including a first positive lens having a positive refractive power, a positive/negative doublet consisting of a second positive lens having a positive refractive power and a negative lens having a negative refractive power and a third positive lens having a positive refractive power sequentially arranged from the object side;
a fourth lens group having a positive refractive power; and
a fifth lens group having a positive refractive power,
wherein the first through fifth lens groups are sequentially arranged from an object side, and
wherein the first through fifth lens groups are moved such that during zooming from a wide angle position to a telephoto position, a distance between the first and second lens groups is increased, a distance between the second and third lens groups is decreased, the third and fourth lens groups move toward the object side, a distance between the third and fourth lens groups is changed, and a distance between the fourth and fifth lens groups is increased.

15. The zoom lens optical system of claim 14, wherein the first lens group includes a first lens having a negative refractive power and a second lens having a positive refractive power.

16. The zoom lens optical system of claim 15, wherein a refractive index $N_{I\_L2}$ of the second lens satisfies $1.65<N_{I\_L2}<1.8$.

17. The zoom lens optical system of claim 14, wherein a refractive index $N_{III\_L2}$ of the second positive lens in the third lens group satisfies $N_{III\_L8}<1.5$ and an Abbe number $V_{III\_L8}$ of the second positive lens satisfies $V_{III\_L8}>80$.

18. The zoom lens optical system of claim 14, wherein when $f_W$ and $f_{IV}$ are the overall focal length at the wide angle position and the focal length of the fourth lens group IV, respectively, the fourth lens group satisfies $0<f_W/f_{IV}<0.20$.

19. The zoom lens optical system of claim 14, wherein when $f_W$ and $f_{II}$ are the overall focal length at the wide angle position and the focal length of the second lens group II, respectively, the second lens group satisfies $-0.90<f_W/f_{II}<-0.50$.

20. A zoom lens optical system comprising:
a first lens group with a positive refractive power and including a first lens having a negative refractive power and a second lens having a positive refractive power;
a second lens group having a negative refractive power;
a third lens group having a positive refractive power;
a fourth lens group having a positive refractive power; and
a fifth lens group having a positive refractive power,
a third lens group with a positive refractive power and including a first positive lens having a positive refractive power, a positive/negative doublet consisting of a second positive lens having a positive refractive power and a negative lens having a negative refractive power and a third positive lens having a positive refractive power sequentially arranged from the object side;
a fourth lens group having a positive refractive power; and
a fifth lens group having a positive refractive power,
wherein the first through fifth lens groups are sequentially arranged from an object side, and
wherein the first through fifth lens groups are moved such that during zooming from a wide angle position to a telephoto position, a distance between the first and second lens groups is increased, a distance between the second and third lens groups is decreased, the third and fourth lens groups move toward the object side, a distance between the third and fourth lens groups is changed, and a distance between the fourth and fifth lens groups is increased.

21. The zoom lens optical system of claim 20, wherein a refractive index $N_{I\_L2}$ of the second lens satisfies $1.65<N_{I\_L2}<1.8$.

22. The zoom lens optical system of claim 20, wherein when $f_W$ and $f_{IV}$ are the overall focal length at the wide angle position and the focal length of the fourth lens group IV, respectively, the fourth lens group satisfies $0<f_W/f_{IV}<0.20$.

23. The zoom lens optical system of claim 20, wherein when $f_W$ and $f_{II}$ are the overall focal length at the wide angle position and the focal length of the second lens group II, respectively, the second lens group satisfies $-0.90<f_W/f_{II}<-0.50$.

24. The zoom lens optical system of claim 20, wherein the first and second lenses are cemented together to form a doublet.

25. A digital camera having a zoom lens optical system according to claim 1.

26. A digital camera having a zoom lens optical system according to claim 14.

27. A digital camera having a zoom lens optical system according to claim 20.

28. A zoom lens optical system comprising:
a first lens group having a positive refractive power and including two lenses;
a second lens group having a negative refractive power;
a third lens group having a positive refractive power, the third lens group including a first positive lens having a positive refractive power, a positive/negative doublet consisting of a second positive lens having a positive refractive power and a negative lens having a negative refractive power and a third positive lens having a positive refractive power sequentially arranged from an object side;
a fourth lens group having a positive refractive power; and
a fifth lens group having a positive refractive power,
wherein the first through fifth lens groups are sequentially arranged from an object side and the first lens group is moved during zooming from a wide angle position to a telephoto position.

29. The zoom lens optical system of claim 28, wherein the first positive lens is a double convex lens, the second positive lens is a lens having a convex surface directed toward the object side, and the negative lens is a lens having a concave surface directed toward an image side.

30. The zoom lens optical system of claim 28, wherein a refractive index $N_{III\_L8}$ the second positive lens in the third lens group satisfies $N_{III\_L8}<1.5$ and an Abbe number $V_{III\_L8}$ of the second positive lens satisfies $V_{III\_L8}>80$.

* * * * *